United States Patent
Park et al.

(10) Patent No.: US 12,335,474 B2
(45) Date of Patent: *Jun. 17, 2025

(54) METHOD AND DEVICE FOR ENCODING OR DECODING ENCODING UNIT OF PICTURE OUTLINE

(71) Applicant: SAMSUNG ELECTRONICS CO., LTD., Suwon-si (KR)

(72) Inventors: Min-woo Park, Yongin-si (KR); Bo-ra Jin, Yongin-si (KR); Chan-yul Kim, Seongnam-si (KR); Jung-hye Min, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,282

(22) Filed: Jan. 17, 2024

(65) Prior Publication Data

US 2024/0155124 A1    May 9, 2024

Related U.S. Application Data

(63) Continuation of application No. 17/882,236, filed on Aug. 5, 2022, now Pat. No. 11,924,425, which is a
(Continued)

(51) Int. Cl.
*H04N 19/11*    (2014.01)
*H04N 19/119*   (2014.01)
(Continued)

(52) U.S. Cl.
CPC .......... *H04N 19/119* (2014.11); *H04N 19/14* (2014.11); *H04N 19/167* (2014.11); *H04N 19/172* (2014.11); *H04N 19/176* (2014.11)

(58) Field of Classification Search
None
See application file for complete search history.

(56) References Cited

U.S. PATENT DOCUMENTS 8,090,154 B2   1/2012   Cho
9,277,239 B2   3/2016   Min et al.
(Continued)

FOREIGN PATENT DOCUMENTS

CN   102640492 A   8/2012
EP   2945379       11/2015
(Continued)

OTHER PUBLICATIONS

Communication dated Nov. 2, 2022 issued by the National Intellectual Property Administration, PRC, in counterpart Chinese Application No. 201680091245.7.
(Continued)

*Primary Examiner* — Chikaodili E Anyikire
(74) *Attorney, Agent, or Firm* — Sughrue Mion, PLLC

(57) ABSTRACT

Provided are a method and apparatus for encoding or decoding a coding unit on an outline of a picture. An image decoding method and apparatus according to an embodiment determine whether a current coding unit extends across an outline of a picture, by comparing a location of the current coding unit in the picture to at least one of a width and a height of the picture, split the current coding unit in at least one direction into a plurality of coding units based on a shape of the current coding unit upon determining that the
(Continued)

current coding unit extends across the outline of the picture, obtain block shape information and split type information of the current coding unit from a bitstream and split the current coding unit into a plurality of coding units based on the block shape information and the split type information upon determining that the current coding unit does not extend across the outline of the picture, and decode a coding unit that is no longer split among the plurality of coding units.

3 Claims, 26 Drawing Sheets

Related U.S. Application Data continuation of application No. 16/339,270, filed as application No. PCT/KR2016/011295 on Oct. 10, 2016, now Pat. No. 11,438,586.

(51) Int. Cl.
*H04N 19/14* (2014.01)
*H04N 19/167* (2014.01)
*H04N 19/172* (2014.01)
*H04N 19/176* (2014.01)

(56) References Cited

U.S. PATENT DOCUMENTS

| | | | |
|---|---|---|---|
| 2007/0253490 A1 | 11/2007 | Makino | |
| 2011/0103701 A1* | 5/2011 | Cheon | H04N 19/61 382/233 |
| 2013/0287312 A1 | 10/2013 | Minezawa et al. | |
| 2013/0315312 A1 | 11/2013 | Amano et al. | |
| 2016/0373766 A1* | 12/2016 | Fuldseth | H04N 19/172 |
| 2017/0244964 A1 | 8/2017 | Liu et al. | |
| 2019/0075328 A1 | 3/2019 | Huang et al. | |
| 2019/0246106 A1 | 8/2019 | Park et al. | |

FOREIGN PATENT DOCUMENTS

| | | |
|---|---|---|
| EP | 3059708 A1 | 8/2016 |
| EP | 3 249 611 B1 | 10/2019 |
| IN | 345430 B1 | 10/2013 |
| JP | 2007-318726 A | 12/2007 |
| JP | 2013-509788 A | 3/2013 |
| JP | 2015-084573 A | 4/2015 |
| KR | 10-2009-0055353 A | 6/2009 |
| KR | 10-2011-0047697 A | 5/2011 |
| KR | 10-2014-0139459 A | 12/2014 |
| WO | 2016/090568 A1 | 6/2016 |

OTHER PUBLICATIONS

Yang F et al., "CTB splittng on frame boundary for arbitrary resolution video", Oct. 1, 2010, 3. JCT-VC Meeting; 94. MPEG Meeting; (Joint Collaborative Team on Video Coding of ISO/IECJTC1/SC29/WG11 and ITU-T SG.16; Retrieved from http://wftp3.itu.int/av-arch/jctvc-site/, (4 pages total).
Communication issued Mar. 9, 2022 by the State Intellectual Property Office of People's Republic of China for Chinese Patent Application No. 201680091245.7.
Communication issued Oct. 8, 2021 by the Korean Intellectual Property Office in Korean Application No. 10-2021-7021524.
Communication issued Sep. 22, 2023 by the Korean Intellectual Property Office in Korean Patent Application No. 10-2023-7002058.
Gary J. Sullivan et al., "Overview of the High Efficiency Video Coding (HEVD) Standard", IEEE Transactions on Circuits and Systems for Video Technology, vol. 22, No. 12, Dec. 1, 2012, pp. 1649-1668, (20 pages total).
Communication dated Apr. 7, 2020, issued by the Japanese Patent Office in counterpart Japanese Application No. 2019-519207.
Communication dated Aug. 2, 2021 issued by the Korean Intellectual Property Office in Korean Application No. 10-2019-7007378.
Communication dated Dec. 5, 2020 issued by the Korean Intellectual Property Office in counterpart Korean Application No. 10-2019-7007378.
Communication dated Jul. 14, 2020 from the Japanese Patent Office in application No. 2019-519207.
Communication dated Jul. 4, 2019, issued by the European Patent Office in counterpart European Application No. 16918864.6.
Communication dated Jul. 5, 2022, issued by the Japan Patent Office in counterpart Japanese Patent Application No. 2021-128196.
Communication dated Jun. 28, 2022, issued by the European Patent Office in counterpart European Application No. 16918864.6.
Communication dated Jun. 3, 2022, issued by the European Patent Office in counterpart European Application No. 16918864.6.
Communication dated Jun. 8, 2021 issued by the Korean Intellectual Property Office in Korean Application No. 10-2019-7007378.
X. Li et al., "Multi-Type-Tree", Joint Video Exploration Team (JVET) of ITU-T SG 16 WP 3 and ISO/IEC JTC 1/SC 29/WG 11, 4th Meeting, Chengdu, CN, JVET-D0117, Oct. 6, 2016, 5 pages.
International Search Report (PCT/ISA/210) & Written Opinion (PCT/ISA/237) dated Jul. 3, 2017 issued by the International Searching Authority in International Application No. PCT/KR2016/011295.
Communication issued May 16, 2024 by the Korean Intellectual Property Office in the Korean Patent Application No. 10-2023-7002058.
Communication issued May 21, 2024 by the Japanese Patent Office in the Japanese Patent Application No. 2023-40705.

\* cited by examiner

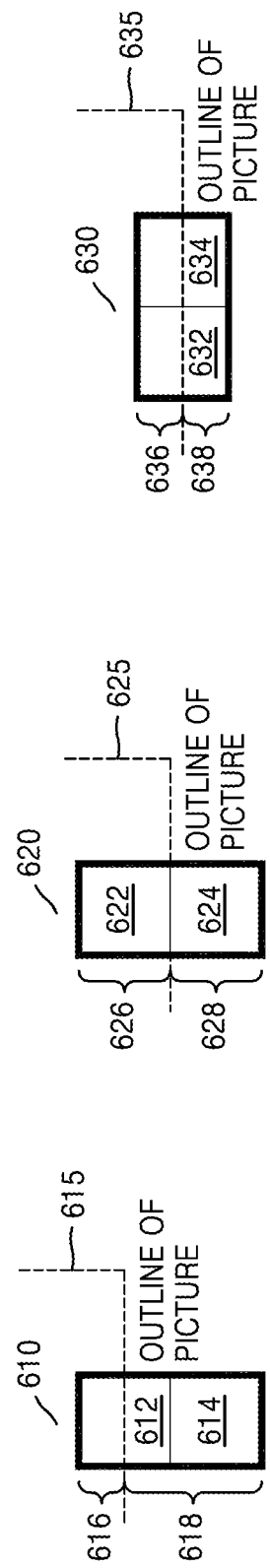

FIG. 20

| BLOCK SHAPE / DEPTH | 0: SQUARE | 1: NS_VER | 2: NS_HOR |
|---|---|---|---|
| DEPTH D | 2000 ▢ | ▯ 2010 | 2020 ▭ |
| DEPTH D+1 | ▢ 2002 | ▯ 2012 | ▭ 2022 |
| DEPTH D+2 | ▢ 2004 | ▯ 2014 | ▭ 2024 |
| ... | ... | ... | ... |

METHOD AND DEVICE FOR ENCODING OR DECODING ENCODING UNIT OF PICTURE OUTLINE

CROSS-REFERENCE TO RELATED APPLICATIONS

This application is a continuation of U.S. patent application Ser. No. 17/882,236, filed Aug. 5, 2022, which is a continuation application of U.S. patent application Ser. No. 16/339,270, filed on Apr. 3, 2019 (now U.S. Pat. No. 11,438,856 issued Sep. 6, 2022), which is a national stage application of International Patent Application No. PCT/KR2016/011295, filed on Oct. 10, 2016.

TECHNICAL FIELD

The present disclosure relates to an image encoding or decoding method and apparatus, and more particularly, to a method and apparatus for encoding or decoding a coding unit on an outline of a picture.

BACKGROUND ART

Image data is encoded by a codec conforming to a predetermined data compression standard, e.g., the Moving Picture Expert Group (MPEG) standard, and then is stored in a recording medium or transmitted through a communication channel in the form of a bitstream.

As hardware capable of reproducing and storing high-resolution or high-quality image content has been developed and become popularized, a codec capable of efficiently encoding or decoding the high-resolution or high-quality image content is in high demand. To reproduce the encoded image content, the image content may be decoded. Currently, methods of effectively compressing the high-resolution or high-quality image content are used. For example, an efficient image compression method based on an arbitrary procedure of processing an image to be encoded is used.

Various data units may be used for image compression, and a hierarchical structure may be present between the data units. A data unit may be split in various ways to determine the size of a data unit used for image compression, and image encoding or decoding may be performed by determining a data unit optimized for image characteristics.

DESCRIPTION OF EMBODIMENTS

Technical Problem

Provided are a method and apparatus for encoding or decoding a coding unit on an outline of a picture.

Solution to Problem

According to an aspect of the present disclosure, an image decoding method includes determining whether a current coding unit extends across an outline of a picture, by comparing a location of the current coding unit in the picture to at least one of a width and a height of the picture, splitting the current coding unit in at least one direction into a plurality of coding units based on a shape of the current coding unit upon determining that the current coding unit extends across the outline of the picture, obtaining block shape information and split type information of the current coding unit from a bitstream and splitting the current coding unit into a plurality of coding units based on the block shape information and the split type information upon determining that the current coding unit does not extend across the outline of the picture, and decoding a coding unit that is no longer split among the plurality of coding units.

When the current coding unit extends across the outline of the picture and has a square shape and the outline of the picture is a vertical outline, the current coding unit may be bi-split in a vertical direction into two non-square coding units.

When the current coding unit extends across the outline of the picture and has a square shape and the outline of the picture is a horizontal outline, the current coding unit may be bi-split in a horizontal direction into two non-square coding units.

When the current coding unit extends across the outline of the picture and has a square shape and the outline of the picture is a corner outline, the current coding unit may be split in vertical and horizontal directions into four square coding units.

When the current coding unit extends across the outline of the picture and has a square shape and the outline of the picture is a corner outline, the current coding unit may be bi-split in whichever one of vertical and horizontal directions having a higher priority, into two non-square coding units.

When the current coding unit extends across the outline of the picture and has a square shape and the outline of the picture is a corner outline, the current coding unit may be bi-split in a horizontal direction into two non-square coding units when a horizontal length of the corner outline, which overlaps with the current coding unit, is greater than a vertical length thereof, may be bi-split in a vertical direction into two non-square coding units when the horizontal length of the corner outline, which overlaps with the current coding unit, is less than the vertical length thereof, or may be split in vertical and horizontal directions into four square coding units or bi-split in whichever one of vertical and horizontal directions having a higher priority, into two coding units when the horizontal length of the corner outline, which overlaps with the current coding unit, is equal to the vertical length thereof.

When the current coding unit extends across the outline of the picture and has a non-square shape, the current coding unit may be bi-split into two square coding units.

When the current coding unit extends across the outline of the picture and has a non-square shape and
when at least one of boundaries between three coding units including one square coding unit and two non-square coding units split in the same direction from the current coding unit corresponds to the outline of the picture, the current coding unit may be split in the same direction into the three coding units including the one square coding unit and the two non-square coding units.

The splitting of the current coding unit in the at least one direction into the plurality of coding units based on the shape of the current coding unit may be recursively performed until at least one of the plurality of coding units does not extend across the outline of the picture.

A width of the picture may be a multiple of a width of a coding unit having a smallest width in the picture, and a height of the picture may be a multiple of a height of a coding unit having a smallest height in the picture.

When a width of the picture is not a multiple of a width of a coding unit having a smallest width in the picture or when a height of the picture is not a multiple of a height of a coding unit having a smallest height in the picture, an area located outside the outline of the picture may be padded with a predetermined value to extend at least one of the width and the height of the picture.

When a width of the picture is not a multiple of a width of a coding unit having a smallest width in the picture or when a height of the picture is not a multiple of a height of a coding unit having a smallest height in the picture, an internal area of the picture adjacent to the outline of the picture may be cropped to reduce at least one of the width and the height of the picture.

When the current coding unit extends across the outline of the picture, the block shape information and the split type information of the current coding unit may not be obtained from the bitstream.

According to another aspect of the present disclosure, an image decoding apparatus includes a coding unit determiner configured to determine whether a current coding unit extends across an outline of a picture, by comparing a location of the current coding unit in the picture to at least one of a width and a height of the picture, to split the current coding unit in at least one direction into a plurality of coding units based on a shape of the current coding unit upon determining that the current coding unit extends across the outline of the picture, and to obtain block shape information and split type information of the current coding unit from a bitstream and split the current coding unit into a plurality of coding units based on the block shape information and the split type information upon determining that the current coding unit does not extend across the outline of the picture, and a decoder configured to decode a coding unit that is no longer split among the plurality of coding units.

According to another aspect of the present disclosure, an image encoding method includes determining whether a current coding unit extends across an outline of a picture, by comparing a location of the current coding unit in the picture to at least one of a width and a height of the picture, splitting the current coding unit in at least one direction into a plurality of coding units based on a shape of the current coding unit upon determining that the current coding unit extends across the outline of the picture, encoding block shape information and split type information of the current coding unit upon determining that the current coding unit does not extend across the outline of the picture, and encoding a coding unit that is no longer split among the plurality of coding units.

BRIEF DESCRIPTION OF DRAWINGS

FIGS. 6A and 6B are diagrams showing a non-square block on an outline of a picture and a method of splitting the non-square block, according to other embodiments.

FIG. 20 illustrates processes of determining a depth of a coding unit as a shape and size of the coding unit are changed, when a plurality of coding units are determined when the coding unit is recursively split, according to an embodiment.

MODE OF DISCLOSURE

Figure 1:
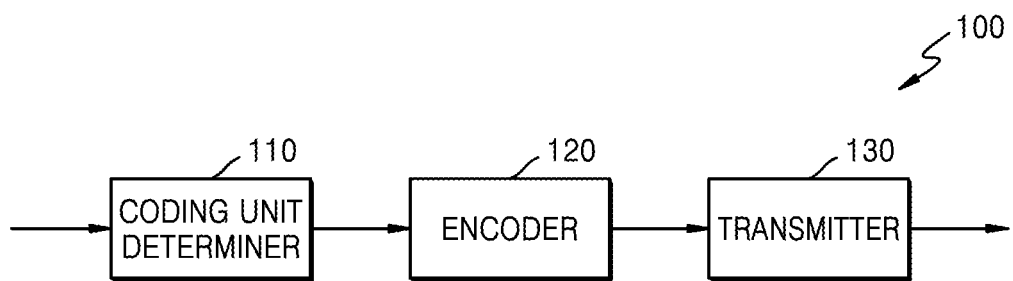
FIG. 1 is a block diagram of an image encoding apparatus 100 according to an embodiment.

Hereinafter, the present disclosure will be described in detail by explaining embodiments of the disclosure with reference to the attached drawings. The disclosure may, however, be embodied in many different forms and is not construed as being limited to the embodiments set forth herein; rather, these embodiments are provided so that this disclosure will be thorough and complete, and will fully convey the concept of the disclosure to one of ordinary skill in the art.

Terminology used in this specification will now be briefly described before describing embodiments in detail.

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used. In this case, the meanings of these terms may be described in corresponding parts of the embodiments. Therefore, it is noted that the terms used herein are construed based on practical meanings thereof and the whole content of this specification, rather than being simply construed based on names of the terms.

As used herein, the singular forms "a", "an", and "the" are intended to include the plural forms as well, unless the context clearly indicates otherwise.

It will be understood that the terms "comprises", "comprising", "includes" and/or "including", when used herein, specify the presence of stated elements, but do not preclude the presence or addition of one or more other elements. The term "unit" is used to denote an entity for performing at least one function or operation, and may be embodied as, but is not limited to, a software element or a hardware element such as a field-programmable gate array (FPGA) or an application-specific integrated circuit (ASIC). A "unit" may be configured to exist in an addressable storage medium or to operate one or more processors. Thus, for example, the "unit" includes elements (e.g., software elements, object-oriented software elements, class elements, and task elements), processes, functions, attributes, procedures, subroutines, segments of program code, drivers, firmware, microcodes, circuits, data, database, data structures, tables, arrays, and variables. Functions provided in elements and "units" may be combined to a smaller number of elements and "units" or may be divided into a larger number of elements and "units".

In the following description, the term "image" may denote a still image, e.g., a still frame of a video, or a moving image, e.g., a video itself.

In the following description, the term "sample" denotes data allocated to a sampling location of an image and denotes data to be processed. For example, pixel values of an image in the spatial domain or transformation coefficients in the transformation domain may be samples. A unit including at least one sample may be defined as a block.

Reference will now be made in detail to embodiments, examples of which are illustrated in the accompanying drawings. In the drawings, parts or elements that are not related to the embodiments are omitted for clarity of explanation.

An image encoding apparatus, an image decoding apparatus, an image encoding method, and an image decoding method according to embodiments will be described in detail below with reference to FIGS. 1 to 23. Specifically, a method and apparatus for encoding or decoding a coding unit on an outline of a picture, according to an embodiment will be described below with reference to FIGS. 1 to 9, and a method of determining a data unit of an image, according to an embodiment will be described below with reference to FIGS. 10 to 23.

A method and apparatus for encoding or decoding a coding unit on an outline of a picture, according to an embodiment will now be described in detail with reference to FIGS. 1 to 9.

FIG. 1 is a block diagram of an image encoding apparatus 100 according to an embodiment.

The image encoding apparatus 100 according to an embodiment includes a coding unit determiner 110, an encoder 120, and a transmitter 130.

According to an embodiment, the coding unit determiner 110 may split image data of a current picture into largest coding units based on a largest size of coding units. Each largest coding unit may include coding units split based on a block shape and a split type. In the largest coding unit according to an embodiment, image data in the spatial domain included in the largest coding unit may be hierarchically split based on the block shape and the split type. A coding unit may have a block shape of a square shape, a rectangular shape, or an arbitrary geometric shape, and is not limited to a predetermined-sized data unit.

When the size of a picture to be encoded is increased and a larger unit is used for image encoding, an image may be encoded at a higher image compression ratio. However, when large coding units are used and the size thereof is fixed, an image may not be efficiently encoded by reflecting variable image characteristics.

For example, when a flat image, e.g., a sea or sky image, is encoded, a compression ratio may be increased by increasing the size of coding units. When a complicated image, e.g., a people or building image, is encoded, a compression ratio may be increased by reducing the size of coding units.

In this regard, the coding unit determiner 110 according to an embodiment sets a different-sized largest coding unit per picture or slice, and sets a block shape and a split type of one or more coding units split from the largest coding unit. The size of the coding units included in the largest coding unit may be variably set based on the block shape and the split type.

A block shape and a split type of one or more coding units may be determined based on rate-distortion cost (R-D cost) calculation. The block shape and the split type may be differently determined per picture or slice or per largest coding unit. The determined block shape and split type is output to the encoder 120 together with image data of each coding unit.

According to an embodiment, the coding units split from the largest coding unit may be characterized in the block shape and the split type. A method of determining coding units based on a block shape and a split type will be described in detail below with reference to FIGS. 10 to 23.

According to an embodiment, the coding units included in the largest coding unit may be predicted or transformed (for example, values in the pixel domain may be transformed into values in the frequency domain) based on different-sized processing units. In other words, the image encoding apparatus 100 may perform a plurality of processing operations for image encoding, based on various-sized and various-shaped processing units. Processing operations such as prediction, transformation, and entropy encoding are performed to encode image data, and equal-sized processing units or different-sized processing units may be used for the operations.

According to an embodiment, a prediction mode of a coding unit may include at least one of an intra mode, an inter mode, and a skip mode, and a certain prediction mode may be performed on only a certain-sized or -shaped coding unit. According to an embodiment, a prediction mode having the smallest coding error may be selected by performing prediction on each coding unit.

The image encoding apparatus 100 may transform image data based on a processing unit having a size different from that of a coding unit. The coding unit may be transformed based on a data unit having a size smaller than or equal to that of the coding unit. Hereinafter, the processing unit serving as a basis of transformation is called a 'transformation unit'.

For encoding, not only information about a block shape and a split type but also prediction information and transformation information are required. Therefore, the encoder 120 may determine, for example, a block shape and a split type, which cause the smallest coding error, a prediction mode per coding unit, the size of a transformation unit for transformation.

According to an embodiment, the encoder 120 may measure a coding error of the coding unit by using rate-distortion optimization (R-D optimization) based on a Lagrangian multiplier).

According to an embodiment, the transmitter 130 outputs image data of coding unit encoded based on at least one coding unit determined by the encoder 120, and information about a coding mode per coding unit, in the form of a bitstream and transmits the bitstream to a decoding apparatus.

The encoded image data may be a result of encoding residual data of an image.

The information about the coding mode per coding unit may include, for example, information about the block shape, the split type, the prediction mode per coding unit, the size of the transformation unit.

Figure 2:
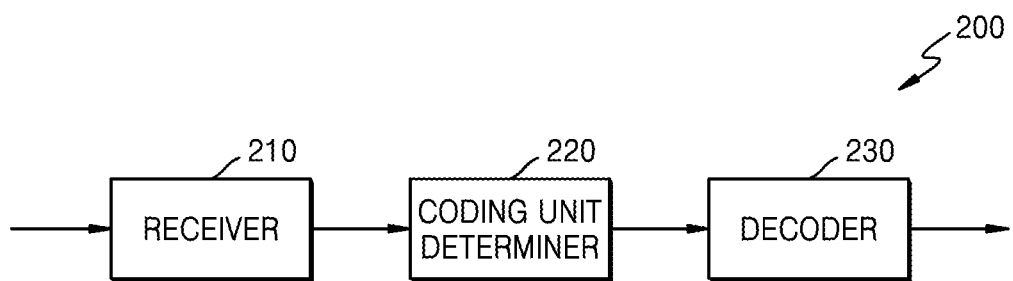
FIG. 2 is a block diagram of an image decoding apparatus 200 according to an embodiment.

FIG. 2 is a block diagram of an image decoding apparatus 200 according to an embodiment.

Referring to FIG. 2, the image decoding apparatus 200 according to an embodiment of the present disclosure includes a receiver 210, a coding unit determiner 220, and a decoder 230.

The receiver 210 according to an embodiment obtains image data per coding unit by parsing a bitstream received by the image decoding apparatus 200, and outputs the image data to the coding unit determiner 220 and the decoder 230. The receiver 210 may extract information about a current picture or slice from a parameter set raw byte sequence payload (RBSP) for the current picture or slice.

The coding unit determiner 220 according to an embodiment extracts information about the size of a largest coding unit, a block shape and a split type of coding units split from the largest coding unit, and a coding mode per coding unit by parsing the bitstream received by the image decoding apparatus 200. The information about the block shape, the split type, and the coding mode is output to the decoder 230. The information about the coding mode may include, for example, information about the block shape, the split type, a prediction mode per coding unit, the size of a transformation unit.

The decoder 230 according to an embodiment reconstruct a current picture by decoding image data of each coding unit based on the coding unit determined by the coding unit determiner 220.

Based on the information about the block shape and the split type of the coding units split from the largest coding unit, the decoder 230 may decode the coding units included in the largest coding unit. The decoding procedure may include inverse quantization, inverse transformation, intra prediction, and motion prediction including motion compensation.

The decoder 230 according to an embodiment may generate residual data by performing inverse quantization and inverse transformation on each coding unit based on the information about the transformation unit of the coding unit.

The decoder 230 may perform intra prediction or inter prediction based on the information about the prediction mode of the coding unit. The decoder 230 may perform prediction on the coding unit, and then generate reconstructed data by using the predicted data and the residual data of the coding unit.

Figure 3:
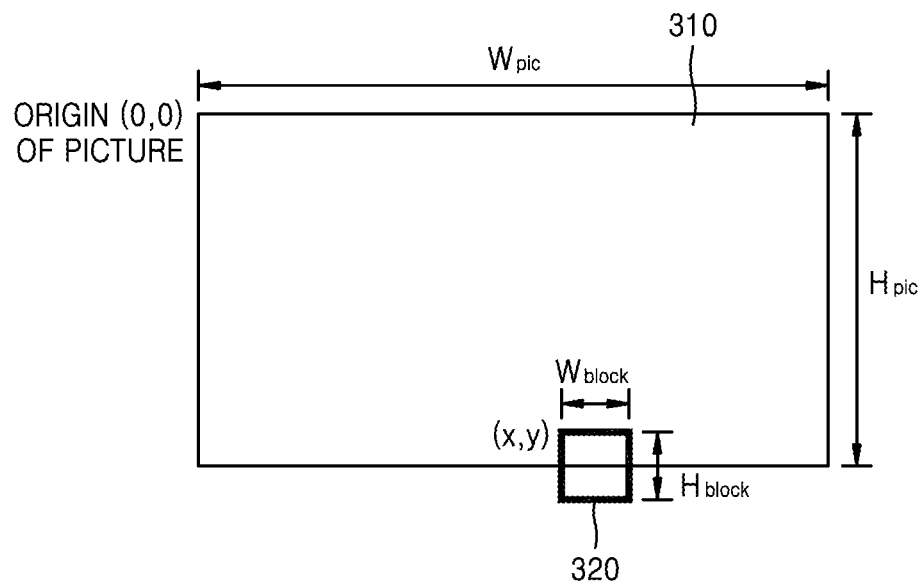
FIG. 3 is a diagram showing a procedure of determining whether a block extends across an outline of a picture, according to an embodiment.

FIG. 3 is a diagram showing a procedure of determining whether a block extends across an outline of a picture, according to an embodiment.

Referring to FIG. 3, when a current picture 310 is encoded by splitting the current picture 310 into largest coding units having a predetermined size and when at least one of a width '$W_{pic}$' and a height '$H_{pic}$' of the current picture 310 is not a multiple of a width and/or a height of the largest coding units, some largest coding units may extend across at least one of a right outline and a bottom outline of the current picture 310.

According to an embodiment, although largest coding units may extend across an outline of a current picture, when image decoded (or encoded) is performed, only an area of the current picture located inside the outline may be decoded (or encoded). Therefore, it needs to be determined whether a current block extends across an outline of a picture. Herein, the current block may be a largest coding unit or one of one or more coding units split from the largest coding unit.

According to an embodiment, to determine whether a current block 320 extends across an outline of the picture 310, a location of the current block 320 in the picture 310 may be compared to at least one of the width '$W_{pic}$' and the height '$H_{pic}$' of the picture 310. For example, a distance between a left pixel of the picture 310 and a right pixel of the current block 320 may be compared to the width '$W_{pic}$' of the picture 310, and a distance between a top pixel of the picture 310 and a bottom pixel of the current block 320 may be compared to the height '$H_{pic}$' of the picture 310.

According to an embodiment, the location of the current block 320 in the picture 310 may be defined as a coordinate (x,y). For example, a location indicating a top left pixel of the current block 320 may be set as the location of the current block 320. When a coordinate of a location indicating a top left pixel of the picture 310 is an origin (0,0) of the picture 310, the location of the current block 320 in the picture 310 may be expressed as the coordinate (x,y) with respect to the origin (0,0).

The following inequalities may be used to determine whether the current block 320 extends across the outline of the picture 310.

$$\text{if}((x+W_{block}-1>=W_{pic})|(y+H_{block}-1>=H_{pic})) \quad \text{[Inequality 1]}$$

$$\text{if}((x+W_{block}-1>=W_{pic})) \quad \text{[Inequality 2]}$$

$$\text{if}((Y+H_{block}-1>=H_{pic})) \quad \text{[Inequality 3]}$$

In Inequalities 1 to 3, x denotes a location of an x coordinate of the current block 320 with respect to an origin of the picture 310, and y denotes a location of a y coordinate of the current block 320 with respect to the origin of the picture 310. $W_{block}$ denotes a width of the current block 320 and $H_{block}$ denotes a height of the current block 320. $W_{pic}$ denotes a width of the picture 310 and $H_{pic}$ denotes a height of the picture 310.

According to an embodiment, when Inequality 1 is satisfied, it is determined that the current block 320 extends across an outline of the picture 310. When Inequality 2 is satisfied, it is determined that the current block 320 extends across a right outline of the picture 310. When Inequality 3 is satisfied, it is determined that the current block 320 extends across a bottom outline of the picture 310.

In the afore-described embodiment, a fact that a block extends across an outline of a picture may also mean that the block lies on the outline of the picture.

Figure 4:
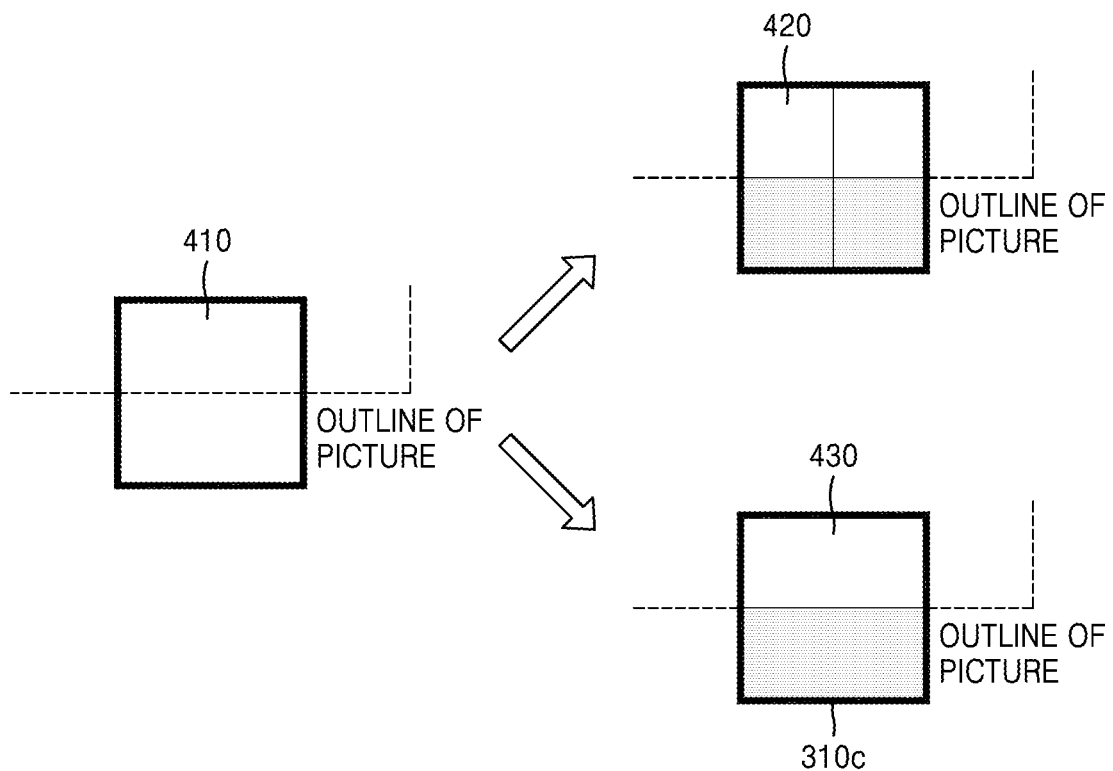
FIG. 4 is a diagram showing a block on an outline of a picture and a method of splitting the block, according to an embodiment.

FIG. 4 is a diagram showing a block on an outline of a picture and a method of splitting the block, according to an embodiment.

According to an embodiment, upon determining that a current block 410 extends across an outline of a picture, the current block 410 may be split in various ways based on a block shape of the current block 410 and a shape of the outline of the picture, which overlaps with the current block 410. When the current block 410 extending across the outline of the picture is split, split information of the current block 410 is not signaled from the encoding apparatus 100 to the decoding apparatus 200. That is, the encoding apparatus 100 does not transmit split information of a block extending across an outline of a picture, and the decoding apparatus 200 does not parse split information of a block extending across an outline of a picture. Although the encoding apparatus 100 determines that a first block extends across an outline of a picture and thus does not transmit split information of the first block, upon determining that a second block split from the first block is located in an internal area of the picture, the encoding apparatus 100 may transmit split information of the second block. Although the decoding apparatus 200 determines that a first block extends across an outline of a picture and thus does not obtain split information of the first block, upon determining that a second block split from the first block is located in an internal area of the picture, the decoding apparatus 200 may obtain split information of the second block.

According to an embodiment, when the current block 410 extends across the outline of the picture, the current block 410 may be split in vertical and horizontal directions into four square blocks 420. The blocks 420 split according to an embodiment may be repeatedly split until the blocks 420 do not extend across the outline of the picture.

According to another embodiment, when the current block 410 extends across the outline of the picture, the current block 410 may be bi-split in the vertical or horizontal direction into two non-square blocks 430. The blocks 430 split according to an embodiment may be repeatedly split until the blocks 430 do not extend across the outline of the picture.

In the afore-described embodiment, a current block may refer to a current coding unit. The current block and blocks split from the current block may have a square shape or a non-square shape.

The amount of information to be encoded may vary depending on whether the split blocks have a square shape or a non-square shape.

Specifically, referring to FIG. 4, in the embodiment in which the current block 410 is split in vertical and horizontal directions into four square blocks 420, the number of blocks to be encoded or decoded is 2. In the embodiment in which the current block 410 is bi-split in a vertical or horizontal direction into two non-square blocks 430, the number of blocks to be encoded or decoded is 1. When the two embodiments are compared, the amount of information (e.g., intra prediction information, motion information, block mode information, and skip flag information) required to encode or decode one non-square block 430 is less than that required to encode or decode two square blocks 420.

In the afore-described embodiment, when the current block 410 extends across the outline of the picture, the split information of the current block 410 may not be signaled. In this case, the current block 410 may be recursively split according to predetermined rules until the blocks 420 or 430 split from the current block 410 do not extend across the outline of the picture. The predetermined rules may include various splitting rules based on, for example, a shape of the current block 410, a shape of the blocks 420 or 430 split from the current block 410, and a shape of the outline of the picture, which overlaps with the current block 410. Therefore, various embodiments for splitting a block on an outline of a picture will be described in detail below with reference to FIGS. 5A to 7D.

FIGS. 5A to 5D are diagrams showing a square block on an outline of a picture and a method of splitting the square block, according to embodiments.

Figure 5A:
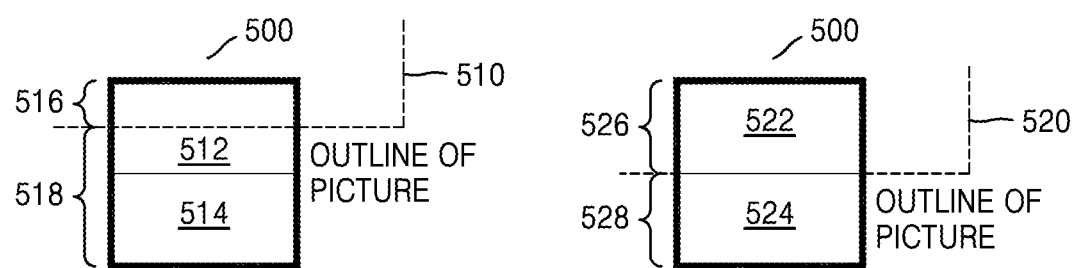
FIGS. 5A to 5D are diagrams showing a square block on an outline of a picture and a method of splitting the square block, according to embodiments.
Figure 5B:
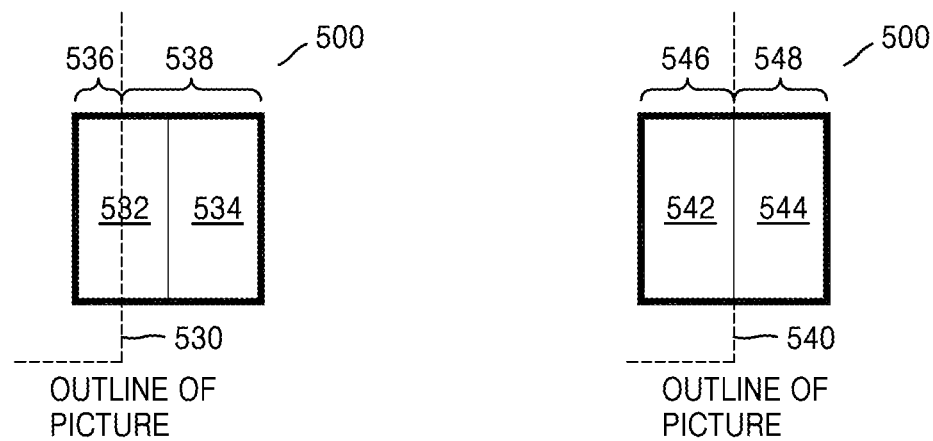
Figure 5C:
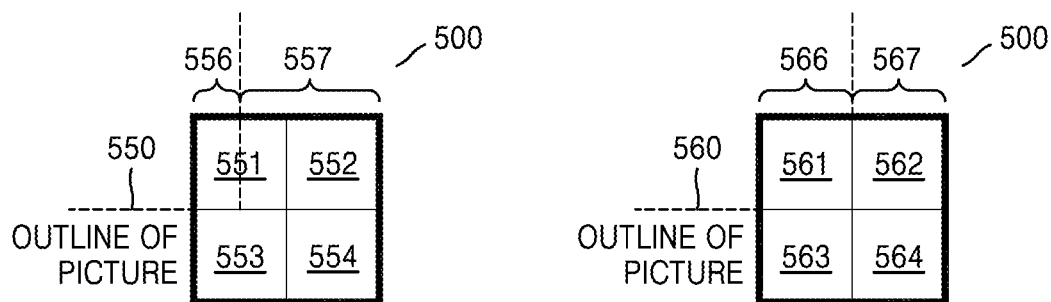
Figure 5D:
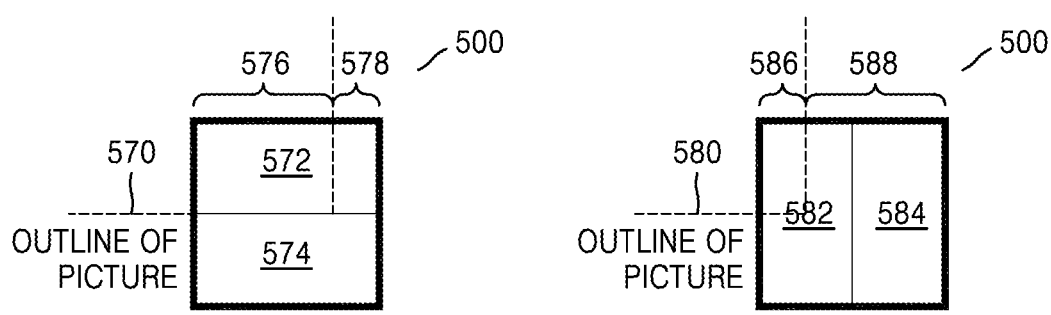

Referring to FIGS. 5A to 5D, a current square block 500 extends across an outline 510, 520, 530, 540, 550, 560, 570, or 580 of a current picture in various ways. FIG. 5A shows a horizontal outline 510 or 520 of the current picture, FIG. 5B shows a vertical outline 530 or 540 of the current picture, and FIGS. 5C and 5D show corner outlines 550 or 560, and 570 or 580 of the current picture.

Referring to FIG. 5A, the current square block 500 may extend across the horizontal outline 510 or 520 of the picture. When the current block 500 extends across the horizontal outline 510 of the picture, an upper area of the current block 500 corresponds to an internal area 516 of the picture and a lower area of the current block 500 corresponds to an external area 518 of the picture. When the current block 500 extends across the horizontal outline 520 of the picture, an upper area of the current block 500 corresponds to an internal area 526 of the picture and a lower area of the current block 500 corresponds to an external area 528 of the picture.

According to an embodiment, when the current square block 500 extends across the horizontal outline 510 or 520 of the picture, the current block 500 may be bi-split in a horizontal direction into two non-square blocks 512 and 514, or 522 and 524. In this case, split information is not required to split the current block 500.

According to an embodiment, one of the two non-square blocks 512 and 514 bi-split in a horizontal direction, e.g., the block 512, may still extend across the horizontal outline 510 of the picture. The non-square block 512 extending across the horizontal outline 510 of the picture may be recursively split according to predetermined rules without using split information until blocks split therefrom do not extend across the horizontal outline 510 of the picture. However, the block 514 located outside the horizontal outline 510 of the picture corresponds to the external area 518 of the picture and thus is not decoded (or encoded).

According to an embodiment, a boundary between the two non-square blocks 522 and 524 bi-split in a horizontal direction may correspond to the horizontal outline 520 of the picture. In this case, the block 522 located inside the horizontal outline 520 of the picture may be decoded (or encoded) without being further split, or be decoded (or encoded) after being split into a plurality of blocks by using split information parsed from a bitstream as described below with reference to FIGS. 10 to 23. However, the block 524 located outside the horizontal outline 520 of the picture corresponds to the external area 528 of the picture and thus is not decoded (or encoded).

Referring to FIG. 5B, the current square block 500 may extend across the vertical outline 530 or 540 of the picture. When the current block 500 extends across the vertical outline 530 of the picture, a left area of the current block 500 corresponds to an internal area 536 of the picture and a right area of the current block 500 corresponds to an external area 538 of the picture. When the current block 500 extends across the vertical outline 540 of the picture, a left area of the current block 500 corresponds to an internal area 546 of the picture and a right area of the current block 500 corresponds to an external area 548 of the picture.

According to an embodiment, when the current square block 500 extends across the vertical outline 530 or 540 of the picture, the current block 500 may be bi-split in a vertical direction into two non-square blocks 532 and 534, or 542 and 544. In this case, split information is not required to split the current block 500.

According to an embodiment, one of the two non-square blocks 532 and 534 bi-split in a vertical direction, e.g., the block 532, may still extend across the vertical outline 530 of the picture. The non-square block 532 extending across the vertical outline 530 of the picture may be recursively split according to predetermined rules without using split information until blocks split therefrom do not extend across the vertical outline 530 of the picture. However, the block 534 located outside the vertical outline 530 of the picture corresponds to the external area 538 of the picture and thus is not decoded (or encoded).

According to an embodiment, a boundary between the two non-square blocks 542 and 544 bi-split in a vertical direction may correspond to the vertical outline 540 of the picture. In this case, the block 542 located inside the vertical outline 540 of the picture may be decoded (or encoded) without being further split, or be decoded (or encoded) after being split into a plurality of blocks by using split information parsed from a bitstream as described below with reference to FIGS. 10 to 23. However, the block 544 located outside the vertical outline 540 of the picture corresponds to the external area 548 of the picture and thus is not decoded (or encoded).

Referring to FIG. 5C, the current square block 500 may extend across the corner outline 550 or 560 of the picture. When the current block 500 extends across the corner outline 550 of the picture, an upper left area of the current block 500 corresponds to an internal area 556 of the picture and the other area of the current block 500 corresponds to an external area 557 of the picture. When the current block 500 extends across the corner outline 560 of the picture, an upper left area of the current block 500 corresponds to an internal area 566 of the picture and the other area of the current block 500 corresponds to an external area 567 of the picture.

According to an embodiment, when the square current block 500 extends across the corner outline 550 or 560 of the picture, the current block 500 may be split in horizontal and vertical directions into four square blocks 551 to 554, or 561 to 564. In this case, split information is not required to split the current block 500.

According to an embodiment, one of the four square blocks 551 to 554 split in horizontal and vertical directions, e.g., the block 551, may still extend across the corner outline 550 of the picture. The square block 551 extending across the corner outline 550 of the picture may be recursively split according to predetermined rules without using split information until blocks split therefrom do not extend across the corner outline 550 of the picture. However, the blocks 552 to 554 located outside the corner outline 550 of the picture correspond to the external area 557 of the picture and thus are not decoded (or encoded).

According to an embodiment, at least one of boundaries between the four square blocks 561 to 564 split in horizontal and vertical directions may correspond to the corner outline 560 of the picture. In this case, the block 561 located inside the corner outline 560 of the picture may be decoded (or encoded) without being further split, or be decoded (or encoded) after being split into a plurality of blocks by using split information parsed from a bitstream as described below with reference to FIGS. 10 to 23. However, the blocks 562 to 564 located outside the corner outline 560 of the picture correspond to the external area 567 of the picture and thus are not decoded (or encoded).

Referring to FIG. 5D, the current square block 500 may extend across the corner outline 570 or 580 of the picture. When the current block 500 extends across the corner outline 570 of the picture, an upper left area of the current block 500 corresponds to an internal area 576 of the picture and the other area of the current block 500 corresponds to an external area 578 of the picture. When the current block 500 extends across the corner outline 580 of the picture, an upper left area of the current block 500 corresponds to an internal area 586 of the picture and the other area of the current block 500 corresponds to an external area 588 of the picture.

According to an embodiment, when the current square block 500 extends across the corner outline 570 or 580 of the picture, the current block 500 may be bi-split in whichever one of horizontal and vertical directions having a higher priority, into two non-square blocks. That is, when the priority of a horizontal direction is higher than that of a vertical direction, the current block 500 may be split in a horizontal direction into two non-square blocks 572 and 574. Otherwise, when the priority of a vertical direction is higher than that of a horizontal direction, the current block 500 may be split in a vertical direction into two non-square blocks 582 and 584. According to an embodiment, information about the priorities may be parsed and obtained from a bitstream. According to another embodiment, the priorities may be determined based on, for example, a length or a shape of an outline of a picture. According to another embodiment, the priorities may be determined by comparing horizontal and vertical lengths of a block included in an internal area of a picture.

According to an embodiment, the priorities may be determined based on horizontal and vertical lengths of a corner outline of a picture, which overlaps with the current block 500. According to an embodiment, when the horizontal length of the corner outline 570 of the picture, which overlaps with the current block 500, is greater than the vertical length thereof, the current block 500 may be bi-split in a horizontal direction into the two non-square blocks 572 and 574. According to an embodiment, when the horizontal length of the corner outline 580 of the picture, which overlaps with the current block 500, is less than the vertical length thereof, the current block 500 may be bi-split in a vertical direction into the two non-square blocks 582 and 584. According to an embodiment, when the horizontal length of a corner outline (not shown) of a picture, which overlaps with the current block 500, is equal to the vertical length thereof, the current block 500 may be split in horizontal and vertical directions into four square blocks, or be split in one of horizontal and vertical directions (or a direction having a higher priority) into two non-square blocks.

According to an embodiment, one of the two non-square blocks 572 and 574 bi-split in a horizontal direction, e.g., the block 572, may still extend across the corner outline 570 of the picture. The non-square block 572 extending across the corner outline 570 of the picture may be recursively split according to predetermined rules without using split information until blocks split therefrom do not extend across the corner outline 570 of the picture. However, the block 574 located outside the corner outline 570 of the picture corresponds to the external area 578 of the picture and thus is not decoded (or encoded).

According to an embodiment, one of the two non-square blocks 582 and 584 bi-split in a vertical direction, e.g., the block 582, may still extend across the corner outline 580 of the picture. The non-square block 582 extending across the corner outline 580 of the picture may be recursively split according to predetermined rules without using split information until blocks split therefrom do not extend across the corner outline 570 of the picture. However, the block 584 located outside the corner outline 580 of the picture corresponds to the external area 588 of the picture and thus is not decoded (or encoded).

Figure 6B:
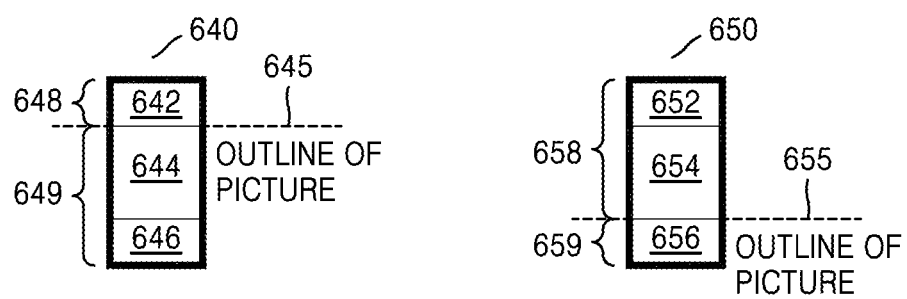

FIGS. 6A and 6B are diagrams showing a non-square block on an outline of a picture and a method of splitting the non-square block, according to other embodiments.

Referring to FIGS. 6A and 6B, a current non-square block 610, 620, 630, 640, or 650 extends across an outline 615, 625, 635, 645, or 655 of a current picture in various ways. FIG. 6A shows a case when a vertical non-square block 610 or 620 or a horizontal non-square block 630 extends across the outline 615, 625, or 635 of the picture. Although the outlines 615, 625, and 635 of the picture are illustrated as horizontal outlines in FIG. 6A for convenience of explanation, each of the outlines 615, 625, and 635 of the picture may be one of a horizontal outline, a vertical outline, and a corner outline. FIG. 6B shows a case when the outline 645 or 655 of the picture corresponds to at least one of boundaries between three blocks split in the same direction from the non-square block 640 or 650. Although the non-square blocks 630 and 640 are illustrated as vertical blocks in FIG. 6B for convenience of explanation, each of the non-square blocks 630 and 640 may be a horizontal block or a vertical block. Each of the outlines 646 and 655 of the picture illustrated in FIG. 6B may be one of a horizontal outline, a vertical outline, and a corner outline.

Referring to FIG. 6A, the non-square block 610, 620, or 630 may extend across the outline 615, 625, or 635 of the picture. When the vertical non-square block 610 or 620 extends across the outline 615 or 625 of the picture, an upper area of the vertical non-square block 610 or 620 corresponds to an internal area 616 or 626 of the picture and a lower area of the vertical non-square block 610 or 620 corresponds to an external area 618 or 628 of the picture. When the horizontal non-square block 630 extends across the outline 635 of the picture, an upper area of the horizontal non-square block 630 corresponds to an internal area 636 of the picture and a lower area of the horizontal non-square block 630 corresponds to an external area 638 of the picture.

According to an embodiment, when the non-square block 610, 620, or 630 extends across the outline 615, 625, or 635 of the picture, the non-square block 610, 620, or 630 may be bi-split into two square blocks 612 and 614, 622 and 624, or 632 and 634. That is, when the vertical non-square block 610 or 620 extends across the outline 615 or 625 of the picture, the vertical non-square block 610 or 620 may be bi-split in a horizontal direction into the two square blocks 612 and 614, or 622 and 624. When the horizontal non-square block 630 extends across the outline 635 of the picture, the horizontal non-square block 630 may be bi-split in a vertical direction into the two square blocks 632 and 634. In this case, split information is not required to split the non-square block 610, 620, or 630.

According to an embodiment, one of the two square blocks 612 and 614 bi-split from the non-square block 610, e.g., the block 612, may still extend across the outline 615 of the picture. The square block 612 extending across the outline 615 of the picture may be recursively split according to predetermined rules without using split information until blocks split therefrom do not extend across the outline 615 of the picture. However, the block 614 located outside the outline 615 of the picture corresponds to the external area 618 of the picture and thus is not decoded (or encoded).

According to an embodiment, a boundary between the two square blocks 622 and 624 bi-split from the non-square block 620 may correspond to the outline 625 of the picture. In this case, the block 622 located inside the outline 625 of the picture may be decoded (or encoded) without being further split, or be decoded (or encoded) after being split into a plurality of blocks by using split information parsed from a bitstream as described below with reference to FIGS. 10 to 23. However, the block 624 located outside the outline 625 of the picture corresponds to the external area 628 of the picture and thus is not decoded (or encoded).

According to an embodiment, both of the two square blocks 632 and 634 bi-split from the non-square block 630 may extend across the outline 635 of the picture. The square blocks 632 and 634 extending across the outline 635 of the picture may be recursively split according to predetermined rules without using split information until blocks split therefrom do not extend across the outline 635 of the picture.

Although the outlines 615, 625, and 635 of the picture are illustrated as horizontal outlines in FIG. 6A for convenience of explanation, each of the outlines 615, 625, and 635 of the picture may be one of a horizontal outline, a vertical outline, and a corner outline. That is, when a non-square block extends across an outline of a picture, the non-square block may be bi-split into two square blocks regardless of whether the outline of the picture is a horizontal outline, a vertical outline, or a corner outline.

Referring to FIG. 6B, the non-square block 640 or 650 extends across the outline 645 or 655 of the picture. An upper area of the non-square block 640 or 650 corresponds to an internal area 648 or 658 of the picture and a lower area of the non-square block 640 or 650 corresponds to an external area 649 or 659 of the picture.

According to an embodiment, the outline 645 or 655 of the picture may correspond to at least one of boundaries between three blocks split in the same direction from the non-square block 640 or 650. In this case, the non-square block 640 or 650 may be split in the same direction into three blocks, e.g., one square block 644 or 654 and two non-square blocks 642 and 646, or 652 and 656. In this case, split information is not required to split the non-square block 640 or 650.

According to an embodiment, a boundary between two of the three blocks 642, 644, and 646 split in the same direction from the non-square block 640, e.g., the non-square block 642 and the square block 644, may correspond to the outline 645 of the picture. In this case, the non-square block 642 located inside the outline 645 of the picture may be decoded (or encoded) without being further split, or be decoded (or encoded) after being split into a plurality of blocks by using split information parsed from a bitstream as described below with reference to FIGS. 10 to 23. However, the square block 644 and the non-square block 646 located outside the outline 645 of the picture correspond to the external area 649 of the picture and thus are not decoded (or encoded).

According to an embodiment, a boundary between two of the three blocks 652, 654, and 656 split in the same direction from the non-square block 650, e.g., the square block 654 and the non-square block 656, may correspond to the outline 655 of the picture. In this case, the non-square block 652 and the square block 654 located inside the outline 655 of the picture may be decoded (or encoded) without being further split, or be decoded (or encoded) after being split into a plurality of blocks by using split information parsed from a bitstream as described below with reference to FIGS. 10 to 23. However, the non-square block 656 located outside the outline 655 of the picture corresponds to the external area 659 of the picture and thus is not decoded (or encoded).

FIGS. 7A to 7D are diagrams showing a procedure of recursively splitting a block on an outline of a picture, according to embodiments.

Figure 7A:
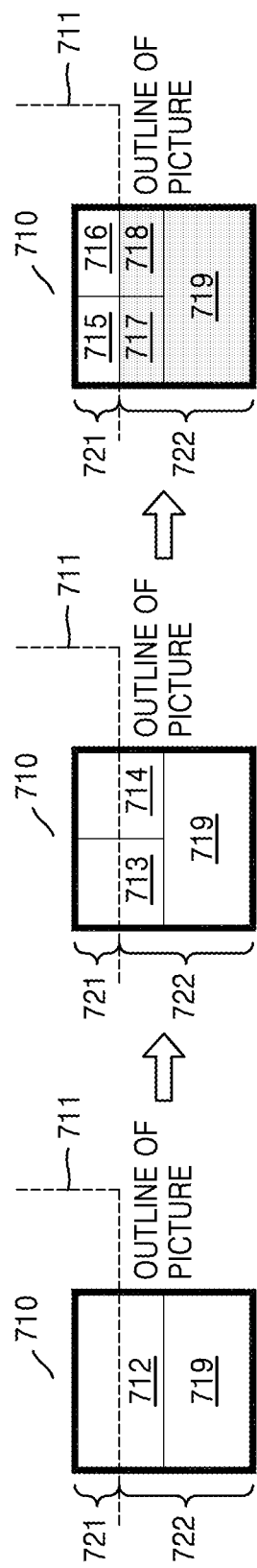
FIGS. 7A to 7D are diagrams showing a procedure of recursively splitting a block on an outline of a picture, according to embodiments.

Referring to FIG. 7A, a first block 710 may extend across an outline 711 of a picture. When the first block 710 extends across the outline 711 of the picture, an upper area of the first block 710 corresponds to an internal area 721 of the picture and a lower area of the first block 710 corresponds to an external area 722 of the picture.

According to an embodiment, when the first block 710 extends across the outline 711 of the picture, the first block 710 may be split into two second blocks 712 and 719 in the same manner as the method of splitting the block 500 extending across the outline 510 of the picture, which is described above in relation to FIG. 5A. However, one of the split second blocks 712 and 719, e.g., the second block 712, may still extend across the outline 711 of the picture. Therefore, the second block 712 may be split again into two third blocks 713 and 714 in the same manner as the method of splitting the block 630 extending across the outline 635 of the picture, which is described above in relation to FIG. 6A. However, the split third blocks 713 and 714 still extend across the outline 711 of the picture and thus may be split once again into fourth blocks 715, 716, 717, and 718 in the same manner as the method of splitting the block 500 extending across the outline 520 of the picture, which is described above in relation to FIG. 5A. Split information is not required in the above-described splitting procedure, i.e., the procedure of splitting the first block 710 into the fourth blocks 715, 716, 717, and 718. Therefore, information indicating that the first block 710 is split into the fourth blocks 715, 716, 717, and 718 does not need to be signaled from the image encoding apparatus 100 to the image decoding apparatus 200.

The fourth blocks 715 and 716 located inside the outline 711 of the picture among the fourth blocks 715, 716, 717, and 718 are included in the internal area 721 of the picture and thus may be decoded (or encoded) without being further split, or be decoded (or encoded) after being split into a plurality of blocks by using split information parsed from a bitstream as described below with reference to FIGS. 10 to 23. However, the blocks 717, 718, and 719 located outside the outline 711 of the picture correspond to the external area 722 of the picture and thus are not decoded (or encoded).

Figure 7B:
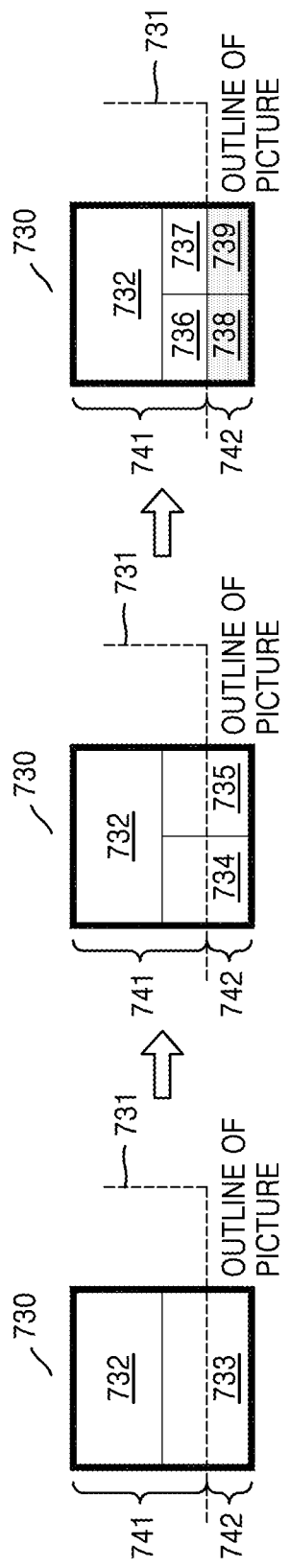

Referring to FIG. 7B, a first block 730 may extend across an outline 731 of a picture. When the first block 730 extends across the outline 731 of the picture, an upper area of the first block 730 corresponds to an internal area 741 of the picture and a lower area of the first block 730 corresponds to an external area 742 of the picture.

According to an embodiment, when the first block 730 extends across the outline 731 of the picture, the first block 730 may be split into two second blocks 732 and 733 in the same manner as the method of splitting the block 500 extending across the outline 510 of the picture, which is described above in relation to FIG. 5A. However, one of the split second blocks 732 and 733, e.g., the second block 733, may still extend across the outline 731 of the picture. Therefore, the second block 733 may be split again into two third blocks 734 and 735 in the same manner as the method of splitting the block 630 extending across the outline 635 of the picture, which is described above in relation to FIG. 6A. However, the split third blocks 734 and 735 still extend across the outline 731 of the picture and thus may be split once again into fourth blocks 736, 737, 738, and 739 in the same manner as the method of splitting the block 500 extending across the outline 520 of the picture, which is described above in relation to FIG. 5A. Split information is not required in the above-described splitting procedure, i.e., the procedure of splitting the first block 730 into the fourth blocks 736, 737, 738, and 739. Therefore, information indicating that the first block 730 is split into the fourth blocks 736, 737, 738, and 739 does not need to be signaled from the image encoding apparatus 100 to the image decoding apparatus 200.

The fourth blocks 732, 736, and 737 located inside the outline 731 of the picture are included in the internal area 741 of the picture and thus may be decoded (or encoded) without being further split, or be decoded (or encoded) after being split into a plurality of blocks by using split information parsed from a bitstream as described below with reference to FIGS. 10 to 23. However, the blocks 738 and 739 located outside the outline 731 of the picture correspond to the external area 742 of the picture and thus are not decoded (or encoded).

Figure 7C:
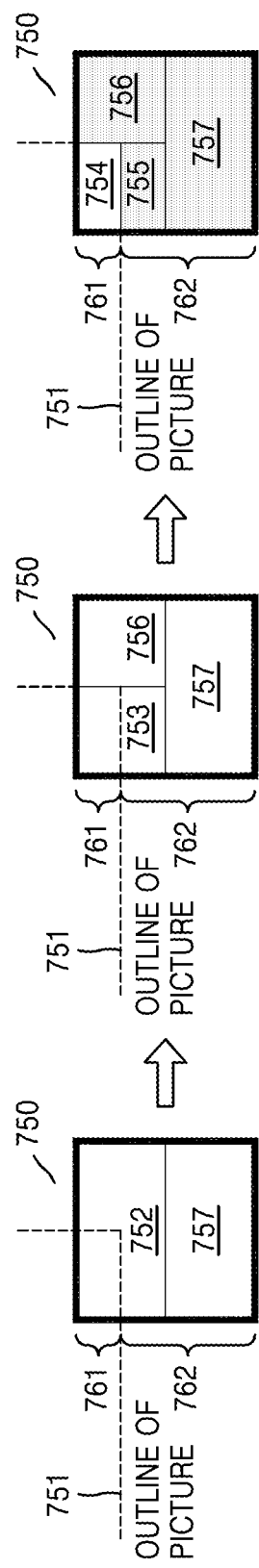

Referring to FIG. 7C, a first block 750 may extend across an outline 751 of a picture. When the first block 750 extends across the outline 751 of the picture, an upper left area of the first block 750 corresponds to an internal area 761 of the picture and the other area of the first block 750 corresponds to an external area 762 of the picture.

According to an embodiment, when the first block 750 extends across the outline 751 of the picture, the first block 750 may be split into two second blocks 752 and 757 in the same manner as the method of splitting the block 500 extending across the outline 570 of the picture, which is described above in relation to FIG. 5D. However, one of the split second blocks 752 and 757, e.g., the second block 752, may still extend across the outline 751 of the picture. Therefore, the second block 752 may be split again into two third blocks 753 and 756 in the same manner as the method of splitting the block 630 extending across the outline 635 of the picture, which is described above in relation to FIG. 6A. However, the split third block 753 still extends across the outline 751 of the picture and thus may be split once again into fourth blocks 754 and 755 in the same manner as the method of splitting the block 500 extending across the outline 520 of the picture, which is described above in relation to FIG. 5A. Split information is not required in the above-described splitting procedure, i.e., the procedure of splitting the first block 750 into the fourth blocks 754 and 755. Therefore, information indicating that the first block 750 is split into the fourth blocks 754 and 755 does not need to be signaled from the image encoding apparatus 100 to the image decoding apparatus 200.

The block 754 located inside the outline 751 of the picture is included in the internal area 761 of the picture and thus may be decoded (or encoded) without being further split, or be decoded (or encoded) after being split into a plurality of blocks by using split information parsed from a bitstream as described below with reference to FIGS. 10 to 23. However, the blocks 755, 756, and 757 located outside the outline 751 of the picture correspond to the external area 762 of the picture and thus are not decoded (or encoded).

Figure 7D:
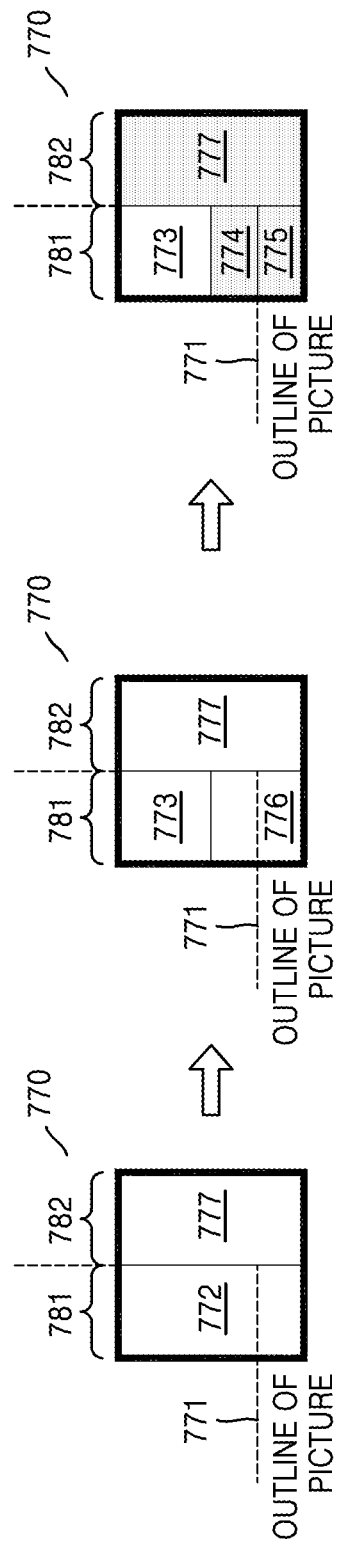

Referring to FIG. 7D, a first block 770 may extend across an outline 771 of a picture. When the first block 770 extends across the outline 771 of the picture, an upper left area of the first block 770 corresponds to an internal area 781 of the picture and the other area of the first block 770 corresponds to an external area 782 of the picture.

According to an embodiment, when the first block 770 extends across the outline 771 of the picture, the first block 770 may be split into two second blocks 772 and 777 in the same manner as the method of splitting the block 500 extending across the outline 580 of the picture, which is described above in relation to FIG. 5D. However, one of the split second blocks 772 and 777, e.g., the second block 772, may still extend across the outline 771 of the picture. Therefore, the second block 772 may be split again into two third blocks 773 and 776 in the same manner as the method of splitting the block 610 extending across the outline 615 of the picture, which is described above in relation to FIG. 6A. However, the third block 773 still extends across the outline 771 of the picture and thus may be split once again into fourth blocks 774 and 775 in the same manner as the method of splitting the block 500 extending across the outline 520 of the picture, which is described above in relation to FIG. 5A. Split information is not required in the above-described splitting procedure, i.e., the procedure of splitting the first block 770 into the fourth blocks 774 and 775. Therefore, information indicating that the first block 770 is split into the fourth blocks 774 and 775 does not need to be signaled from the image encoding apparatus 100 to the image decoding apparatus 200.

The blocks 773 and 774 located inside the outline 771 of the picture is included in the internal area 781 of the picture and thus may be decoded (or encoded) without being further split, or be decoded (or encoded) after being split into a plurality of blocks by using split information parsed from a bitstream as described below with reference to FIGS. 10 to 23. However, the blocks 775 and 777 located outside the outline 771 of the picture correspond to the external area 782 of the picture and thus are not decoded (or encoded).

The image encoding apparatus 100 according to an embodiment may predict, transform (e.g., discrete-cosine-transform), and quantize a block of an internal area of a picture, which does not extend across an outline of a picture, without splitting the block, or may predict, transform, and quantize the block after splitting the block into a plurality of blocks as described below with reference to FIGS. 10 to 23. However, when a block extends across an outline of a picture, the image encoding apparatus 100 encodes only pixel values of an area located inside the outline of the picture based on a result of splitting the block according to the afore-described various embodiments.

The image decoding apparatus 200 according to an embodiment may inversely quantize, inversely transform, and predict a block of an internal area of a picture, which does not extend across an outline of a picture, after or without splitting the block by using split information (e.g., block shape information and split type information) parsed from a bitstream. However, when a block extends across an outline of a picture, the image decoding apparatus 200 decodes only pixel values of an area located inside the outline of the picture based on a result of splitting the block according to the afore-described various embodiments.

According to an embodiment, when a current block extends across an outline of a picture, the current block may be split according to the afore-described various embodiments. Splitting is unavoidable to decode (or encode) only pixel values of an area located inside the outline. As such, information indicating whether to split the current block extending across the outline of the picture does not need to be decoded (or encoded) because a decoder side knows that the current block is split, without using the information indicating whether to split the current block.

According to an embodiment, when a block extends across an outline of a picture, only values of pixels located inside the outline may be decoded (or encoded). As such, decoded data (or encoded data) does not need to be generated for values of unnecessary pixels located outside the outline and thus the amount of computation for decoding (or encoding) may be reduced.

According to the afore-described embodiments, a method of splitting a block extending across an outline of a picture, to decode (or encode) only pixel values of an area within the picture has been disclosed. However, when blocks may be constrained not to extend across an outline of a picture, the splitting method according to the afore-described embodiments does not need to be used.

According to another embodiment, a width and a height of a picture may be multiples of the smallest block size. For example, the width of the picture may be a multiple of a width of a coding unit having the smallest width and the height of the picture may be a multiple of a height of a coding unit having the smallest height.

According to another embodiment, when a width and a height of a picture are not multiples of the smallest block size (or a certain block size), an area located outside an outline of the picture may be padded with a predetermined value to extend at least one of the width and the height of the picture. In this case, information about the actual width and height may be signaled and thus only an area corresponding to the actual width and height may be displayed in a subsequent display procedure.

According to another embodiment, when a width and a height of a picture are not multiples of the smallest block size (or a certain block size), an area adjacent to an outline of the picture may be cropped to reduce at least one of the width and the height of the picture.

Figure 8:
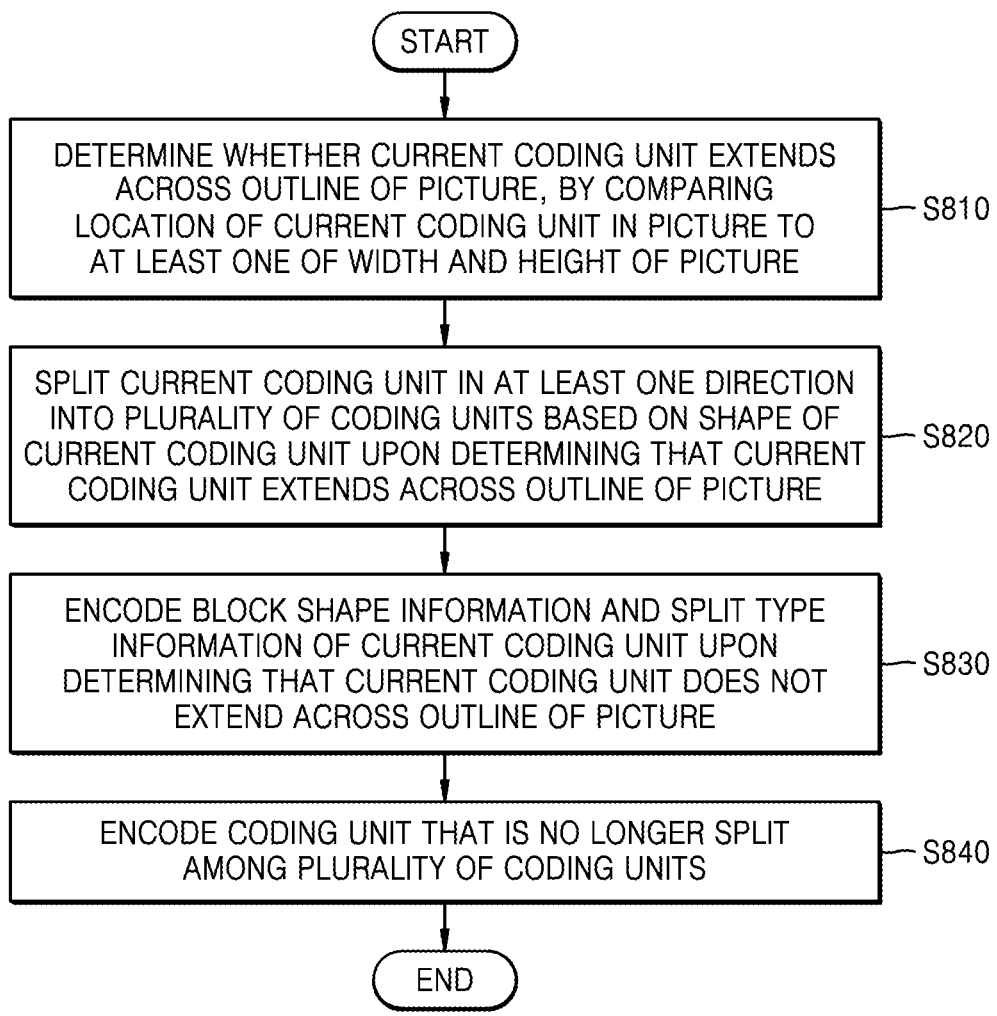
FIG. 8 is a flowchart of an image encoding method according to an embodiment.

FIG. 8 is a flowchart of an image encoding method according to an embodiment.

In operation S810, it is determined whether a current coding unit extends across an outline of a picture, by comparing a location of the current coding unit in the picture to at least one of a width and a height of the picture.

In operation S820, the current coding unit is split in at least one direction into a plurality of coding units based on a shape of the current coding unit upon determining that the current coding unit extends across the outline of the picture. In this case, a splitting method may vary depending on whether the current coding unit has a square shape or a non-square shape.

In operation S830, block shape information and split type information of the current coding unit are encoded upon determining that the current coding unit does not extend across the outline of the picture.

In operation S840, a coding unit that is no longer split among the plurality of coding units is encoded.

Figure 9:
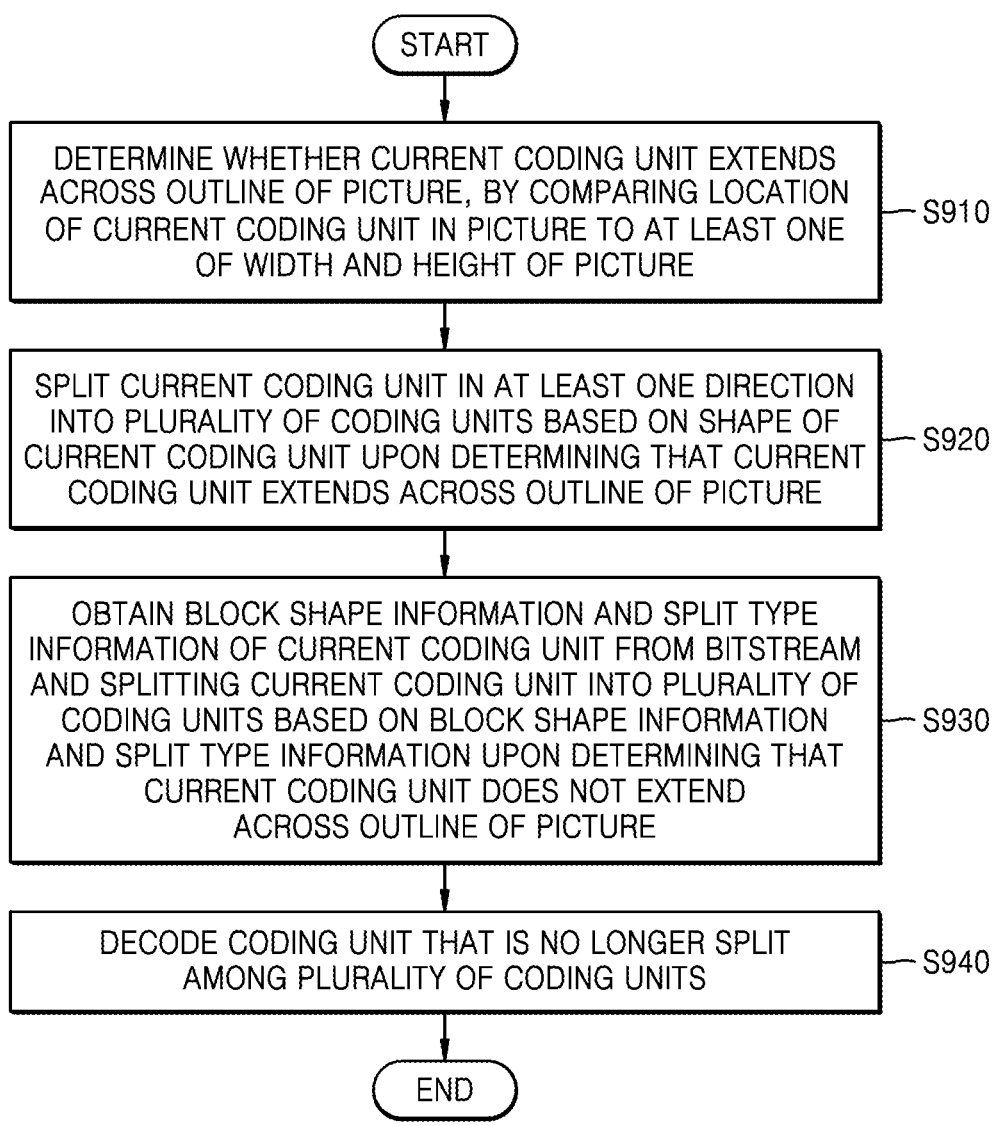
FIG. 9 is a flowchart of an image decoding method according to an embodiment.

FIG. 9 is a flowchart of an image decoding method according to an embodiment.

In operation S910, it is determined whether a current coding unit extends across an outline of a picture, by comparing a location of the current coding unit in the picture to at least one of a width and a height of the picture.

In operation S920, the current coding unit is split in at least one direction into a plurality of coding units based on a shape of the current coding unit upon determining that the current coding unit extends across the outline of the picture. In this case, a splitting method may vary depending on whether the current coding unit has a square shape or a non-square shape.

In operation S930, block shape information and split type information of the current coding unit are obtained from a bitstream and the current coding unit is split into a plurality of coding units based on the block shape information and the split type information upon determining that the current coding unit does not extend across the outline of the picture.

In operation S940, a coding unit that is no longer split among the plurality of coding units is decoded.

A method of determining a data unit of an image, according to an embodiment will now be described in detail with reference to FIGS. 10 to 23.

Figure 10:
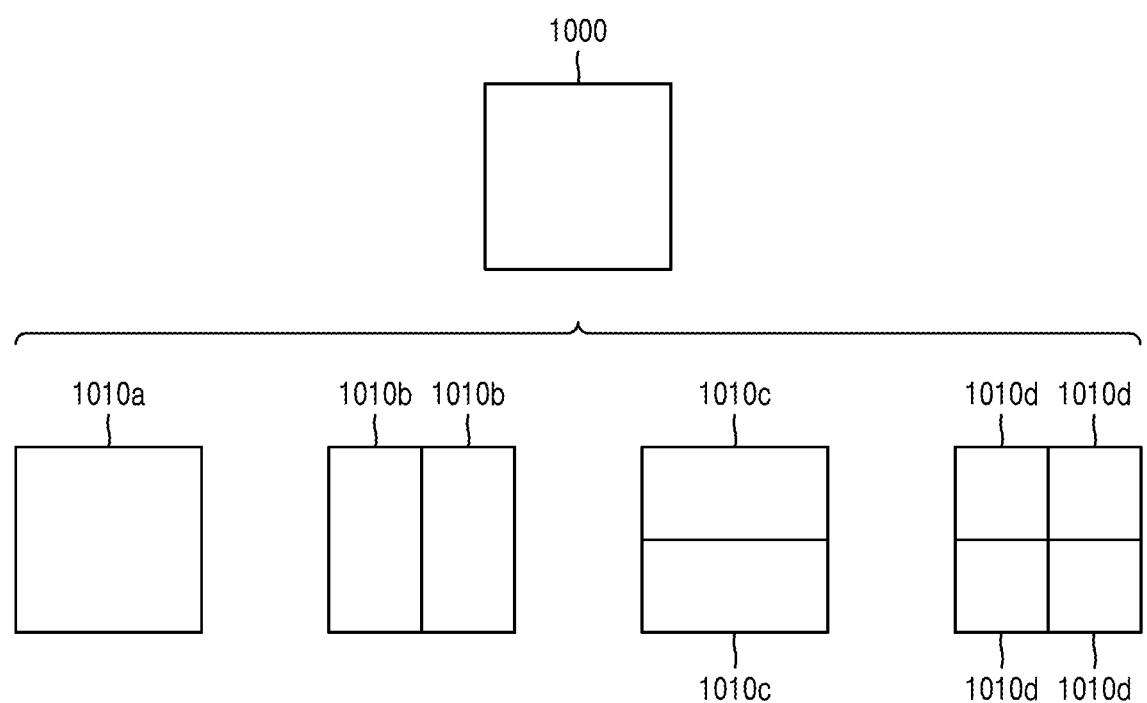
FIG. 10 illustrates processes of determining at least one coding unit as a current coding unit is split, according to an embodiment.

FIG. 10 is a diagram showing a procedure, performed by the image decoding apparatus 200, of determining at least one coding unit by splitting a current coding unit 1000, according to an embodiment.

According to an embodiment, the image decoding apparatus 200 may determine a shape of a coding unit by using block shape information, and determine a shape into which a coding unit is split by using split type information. In other words, a split method of a coding unit, which is indicated by the split type information, may be determined based on a block shape indicated by the block shape information used by the image decoding apparatus 200.

According to an embodiment, the image decoding apparatus 200 may use block shape information indicating that a current coding unit has a square shape. For example, the image decoding apparatus 200 may determine, according to split type information, whether to not split a square coding unit, to split the square coding unit vertically, to split the square coding unit horizontally, or to split the square coding unit into four coding units. Referring to FIG. 10, when block shape information of a current coding unit 1000 indicates a square shape, the decoder 1030 may not split a coding unit 1010a having the same size as the current coding unit 1000 according to split type information indicating non-split, or determine coding units 1010b, 1010c, or 1010d based on split type information indicating a certain split method.

Referring to FIG. 10, the image decoding apparatus 200 may determine two coding units 1010b by splitting the current coding unit 1000 in a vertical direction based on split type information indicating a split in a vertical direction, according to an embodiment. The image decoding apparatus 200 may determine two coding units 1010c by splitting the current coding unit 1000 in a horizontal direction based on split type information indicating a split in a horizontal direction. The image decoding apparatus 200 may determine four coding units 1010d by splitting the current coding unit 1000 in vertical and horizontal directions based on split type information indicating splitting in vertical and horizontal directions. However, a split shape into which a square coding unit may be split is not limited to the above shapes, and may include any shape indicatable by split type information. Certain split shapes into which a square coding unit are split will now be described in detail through various embodiments.

Figure 11:
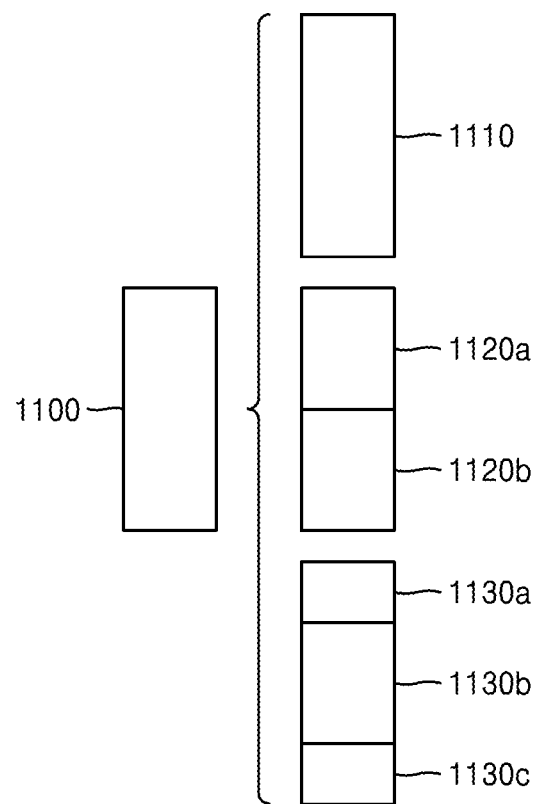
FIG. 11 illustrates processes of determining at least one coding unit when a coding unit having a non-square shape is split, according to an embodiment.
Figure 11:
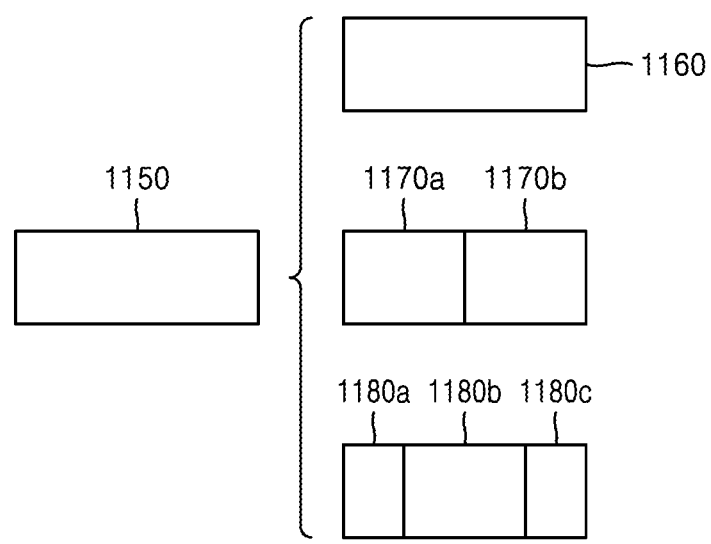

FIG. 11 illustrates processes of determining at least one coding unit when the image decoding apparatus 200 splits a coding unit having a non-square shape, according to an embodiment.

According to an embodiment, the image decoding apparatus 200 may use block shape information indicating that a current coding unit has a non-square shape. The image decoding apparatus 200 may determine, according to split type information, whether to not split the non-square current coding unit or to split the non-square current coding unit via a certain method. Referring to FIG. 11, when block shape information of a current coding unit 1100 or 1150 indicates a non-square shape, the image decoding apparatus 200 may not split coding units 1110 or 1160 having the same size as the current coding unit 1100 or 1150 according to split type information indicating non-split, or determine coding units 1120a, 1120b, 1130a, 1130b, 1130c, 1170a, 1170b, 1180a, 1180b, and 1180c based on split type information indicating a certain split method. A certain split method of splitting a non-square coding unit will now be described in detail through various embodiments.

According to an embodiment, the image decoding apparatus 200 may determine a shape into which a coding unit is split by using split type information, and in this case, the split type information may indicate the number of at least one coding unit generated as the coding unit is split. Referring to FIG. 11, when split type information indicates that the current coding unit 1100 or 1150 is split into two coding units, the image decoding apparatus 200 may determine two coding units 1120a and 1120b or 1170a and 1170b included in the current coding unit 1100 or 1150 by splitting the current coding unit 1100 or 1150 based on the split type information.

According to an embodiment, when the image decoding apparatus 200 splits the current coding unit 1100 or 1150 having a non-square shape based on split type information, the image decoding apparatus 200 may split the current coding unit 1100 or 1150 considering locations of long sides of the current coding unit 1100 or 1150 having a non-square shape. For example, the image decoding apparatus 200 may determine a plurality of coding units by splitting the current coding unit 1100 or 1150 in a direction of splitting the long sides of the current coding unit 1100 or 1150 considering a shape of the current coding unit 1100 or 1150.

According to an embodiment, when split type information indicates that a coding unit is split into an odd number of blocks, the image decoding apparatus 200 may determine the odd number of coding units included in the current coding unit 1100 or 1150. For example, when split type information indicates that the current coding unit 1100 or 1150 is split into three coding units, the image decoding apparatus 200 may split the current coding unit 1100 or 1150 into three coding units 1130a through 1130c or 1180a through 1180c. According to an embodiment, the image decoding apparatus 200 may determine the odd number of coding units included in the current coding unit 1100 or 1150, and the sizes of the determined coding units may not be all the same. For example, the size of coding unit 1130b or 1180b from among the determined odd number of coding units 1130a through 1130c or 1180a through 1180c may be different from the sizes of coding units 1130a and 1130c or 1180a and 1180c. In other words, coding units that may be determined when the current coding unit 1100 or 1150 is split may have a plurality of types of sizes, and in some cases, the coding units 1130a through 1130c or 1180a through 1180c may have different sizes.

According to an embodiment, when split type information indicates that a coding unit is split into an odd number of blocks, the image decoding apparatus 200 may determine the odd number of coding units included in the current coding unit 1100 or 1150, and in addition, may set a certain limit on at least one coding unit from among the odd number of coding units generated via splitting. Referring to FIG. 11, the image decoding apparatus 200 may differentiate decoding processes performed on the coding unit 1130b or 1180b located at the center from among the three coding units 1130a through 1130c or 1180a through 1180c generated as the current coding unit 1100 or 1150 is split from the other coding units 1130a and 1130c or 1180a and 1180c. For example, the image decoding apparatus 200 may limit the coding unit 1130b or 1180b located at the center to be no longer split unlike the other coding units 1130a and 1130c or 1180a and 1180c, or to be split only a certain number of times.

Figure 12:
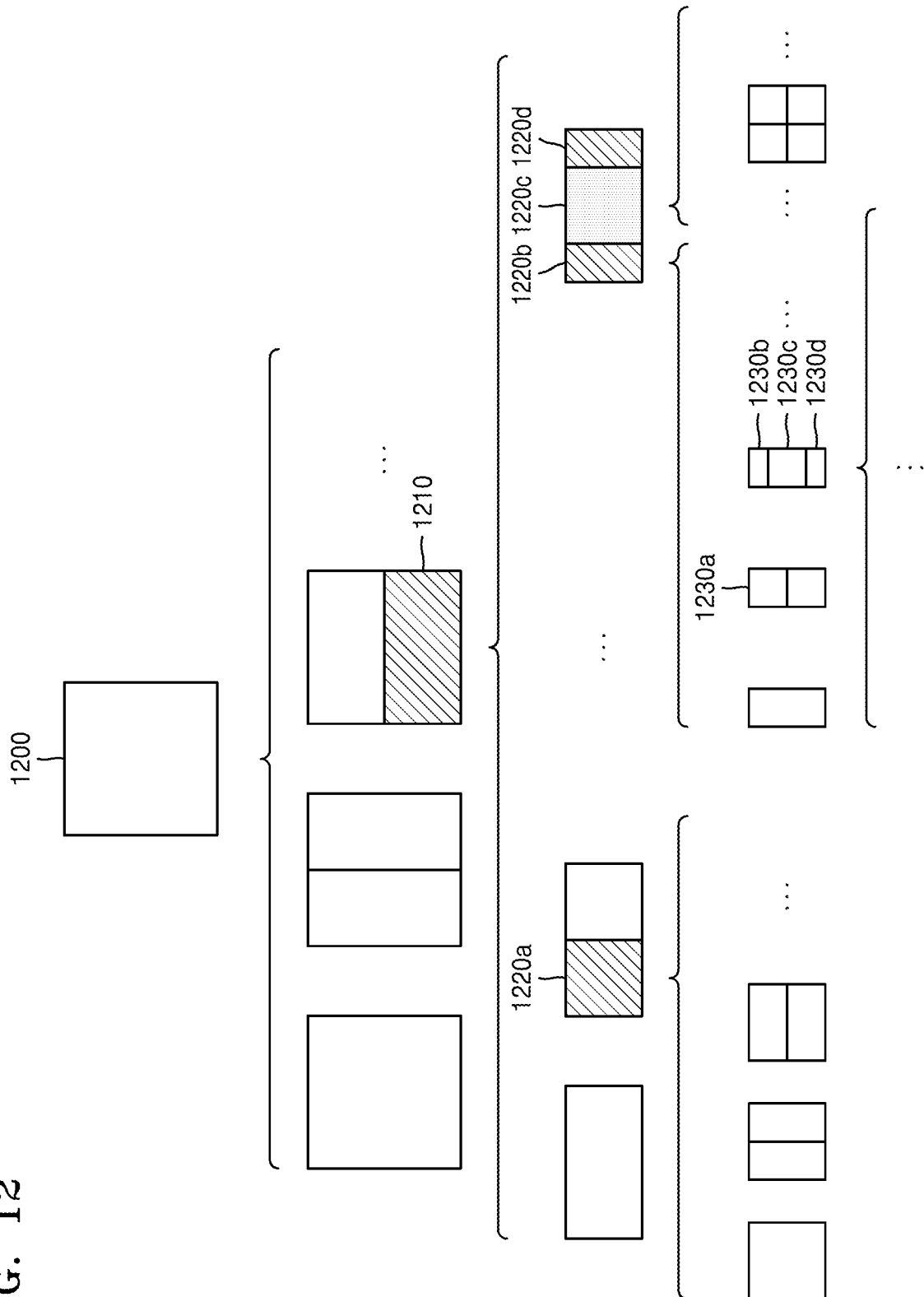
FIG. 12 illustrates processes of splitting a coding unit, based on at least one of a block shape information and split type information, according to an embodiment.

FIG. 12 illustrates processes of the image decoding apparatus 200 splitting a coding unit, based on at least one of a block shape information and split type information, according to an embodiment.

According to an embodiment, the image decoding apparatus 200 may determine that a first coding unit 1200 having a square shape is split or not split into coding units, based on at least one of block shape information and split type information. According to an embodiment, when split type information indicates that the first coding unit 1200 is split in a horizontal direction, the image decoding apparatus 200 may determine a second coding unit 1210 by splitting the first coding unit 1200 in a horizontal direction. A first coding unit, a second coding unit, and a third coding unit used according to an embodiment are terms used to indicate a relation between before and after splitting a coding unit. For example, a second coding unit may be determined by splitting a first coding unit, and a third coding unit may be determined by splitting a second coding unit. Hereinafter, it will be understood that relations between first through third coding units are in accordance with the features described above.

According to an embodiment, the image decoding apparatus 200 may determine that the determined second coding unit 1210 is split or not split into coding units based on at least one of block shape information and split type information. Referring to FIG. 12, the image decoding apparatus 200 may split the second coding unit 1210, which has a non-square shape and is determined by splitting the first coding unit 1200, into at least one third coding unit 1210a, 1220b, 1220c, or 1220d, or may not split the second coding unit 1210, based on at least one of block shape information and split type information. The image decoding apparatus 200 may obtain at least one of the block shape information and the split type information, and obtain a plurality of second coding units (for example, the second coding units 1210) having various shapes by splitting the first coding unit 1200 based on at least one of the obtained block shape information and split type information, wherein the second coding unit 1210 may be split according to a method of splitting the first coding unit 1200 based on at least one of the block shape information and the split type information. According to an embodiment, when the first coding unit 1200 is split into the second coding units 1210 based on at least one of block shape information and split type information with respect to the first coding unit 1200, the second coding unit 1210 may also be split into third coding units (for example, the third coding units 1220a through 1220d) based on at least one of block shape information and split type information with respect to the second coding unit 1210. In other words, a coding unit may be recursively split based on at least one of split type information and block shape information related to each coding unit. Accordingly, a square coding unit may be determined from a non-square coding unit, and such a square coding unit may be recursively split such that a non-square coding unit is determined. Referring to FIG. 12, a certain coding unit (for example, a coding unit located at the center or a square coding unit) from among the odd number of third coding units 1220b through 1220d determined when the second coding unit 1210 having a non-square shape is split may be recursively split. According to an embodiment, the third coding unit 1220c having a square shape from among the third coding units 1220b through 1220d may be split in a horizontal direction into a plurality of fourth coding units. A fourth coding unit 1240 having a non-square shape from among the plurality of fourth coding units may again be split into a plurality of coding units. For example, the fourth coding unit 1240 having a non-square shape may be split into an odd number of coding units 1250a through 1250c.

A method that may be used to recursively split a coding unit will be described below through various embodiments.

According to an embodiment, the image decoding apparatus 200 may determine that each of the third coding units 1220a through 1220d is split into coding units or that the second coding unit 1210 is not split, based on at least one of block shape information and split type information. The image decoding apparatus 200 may split the second coding unit 1210 having a non-square shape into the odd number of third coding units 1220b through 1220d, according to an embodiment. The image decoding apparatus 200 may set a certain limit on a certain third coding unit from among the third coding units 1220b through 1220d. For example, the image decoding apparatus 200 may limit that the third coding unit 1220c located at the center of the third coding units 1220b through 1220d is no longer split, or is split into a settable number of times. Referring to FIG. 12, the image decoding apparatus 200 may limit that the third coding unit 1220c located at the center of the third coding units 1220b through 1220d included in the second coding unit 1210 having a non-square shape is no longer split, is split into a certain split shape (for example, split into four coding units or split into shapes corresponding to those into which the second coding unit 1210 is split), or is split only a certain number of times (for example, split only n times wherein n>0). However, such limits on the third coding unit 1220c located at the center are only examples and should not be interpreted as being limited by those examples, but should be interpreted as including various limits as long as the third coding unit 1220c located at the center are decoded differently from the other third coding units 1220b and 1220d.

According to an embodiment, the image decoding apparatus 200 may obtain at least one of block shape information and split type information used to split a current coding unit from a certain location in the current coding unit.

Figure 13:
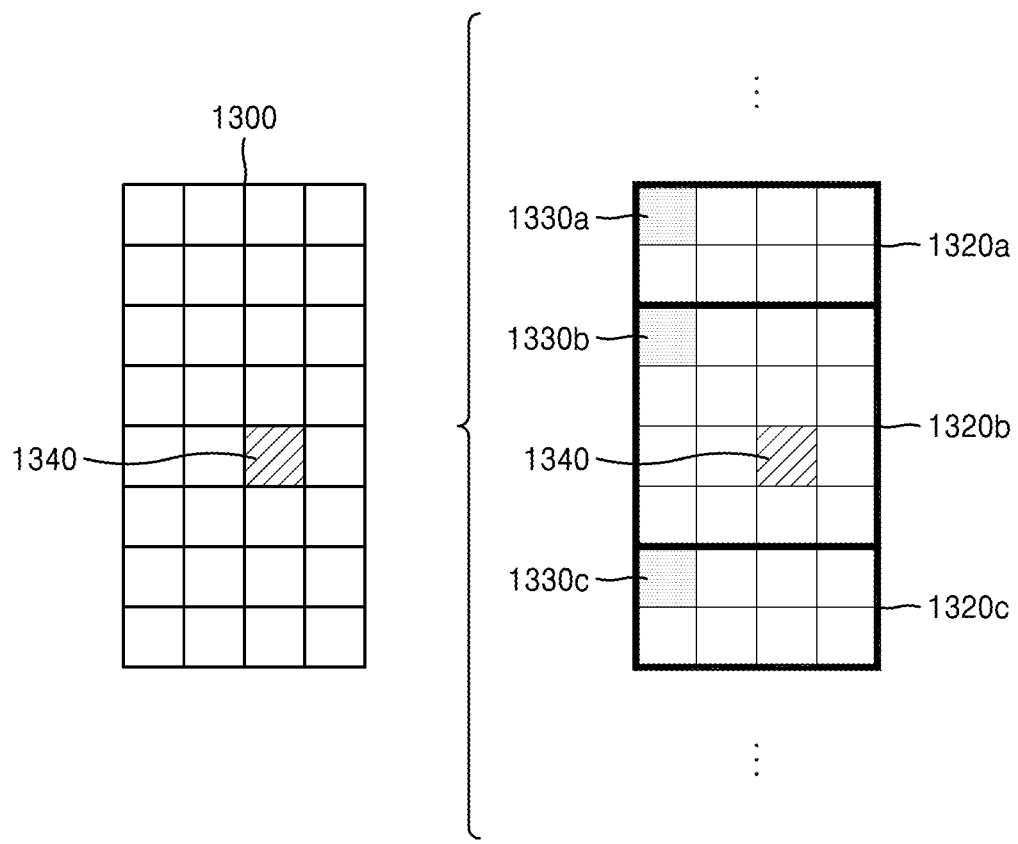
FIG. 13 illustrates a method of determining a predetermined coding unit from among an odd number of coding units, according to an embodiment.

FIG. 13 illustrates a method of determining, by the image decoding apparatus 200, a certain coding unit from among an odd number of coding units, according to an embodiment. Referring to FIG. 13, at least one of block shape information and split type information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and split type information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The image decoding apparatus 200 may determine that a current coding unit is split into coding units having various shapes and sizes or is not split by obtaining at least one of block shape information and split type information from a certain location.

According to an embodiment, the image decoding apparatus 200 may select one coding unit when a current coding unit is split into a certain number of coding units. A method of selecting one of a plurality of coding units may vary, and details thereof will be described below through various embodiments.

According to an embodiment, the image decoding apparatus 200 may split a current coding unit into a plurality of coding units, and determine a coding unit at a certain location.

FIG. 13 illustrates a method of determining, by the image decoding apparatus 200, a coding unit at a certain location from among an odd number of coding units, according to an embodiment.

According to an embodiment, the image decoding apparatus 200 may use information indicating a location of each of the odd number of coding units so as to determine a coding unit located at the center from among the odd number of coding units. Referring to FIG. 13, the image decoding apparatus 200 may determine the odd number of coding units 1320a through 1320c by splitting the current coding unit 1300. The image decoding apparatus 200 may determine the center coding unit 1320b by using information about the locations of the odd number of coding units 1320a through 1320c. For example, the image decoding apparatus 200 may determine the coding unit 1320b located at the center by determining the locations of the coding units 1320a through 1320b based on information indicating locations of certain samples included in the coding units 1320a through 1320c. In detail, the image decoding apparatus 200 may determine the coding unit 1320b located at the center by determining the locations of the coding units 1320a through 1320c based on information indicating locations of upper left samples 1330a through 1330c of the coding units 1320a through 1320c.

According to an embodiment, the information indicating the locations of the upper left samples 1330a through 1330c included in the coding units 1320a through 1320c respectively may include information about a location or coordinates of the coding units 1320a through 1320c in a picture. According to an embodiment, the information indicating the locations of the upper left samples 1330a through 1330c included in the coding units 1320a through 1320c respectively may include information indicating widths or heights of the coding units 1320a through 1320c included in the current coding unit 1300, and such widths or heights may correspond to information indicating differences between coordinates of the coding units 1320a through 1320c in a picture. In other words, the image decoding apparatus 200 may determine the coding unit 1320b located at the center by directly using the information about the locations or coordinates of the coding units 1320a through 1320c in a picture or by using information about the widths or heights of the coding units 1320a through 1320c corresponding to the differences between coordinates.

According to an embodiment, the information indicating the location of the upper left sample 1330a of the upper coding unit 1320a may indicate (xa, ya) coordinates, the information indicating the location of the upper left sample 1330b of the center coding unit 1320b may indicate (xb, yb) coordinates, and the information indicating the location of the upper left sample 1330c of the lower coding unit 1320c may indicate (xc, yc) coordinates. The image decoding apparatus 200 may determine the center coding unit 1320b by using the coordinates of the upper left samples 1330a through 1330c respectively included in the coding units 1320a through 1320c. For example, when the coordinates of the upper left samples 1330a through 1330c are arranged in an ascending order or descending order, the coding unit 1320b including the coordinates (xb, yb) of the sample 1330b located at the center may be determined as a coding unit located at the center from among the coding units 1320a through 1320c determined when the current coding unit 1300 is split. However, coordinates indicating the locations of the upper left samples 1330a through 1330c may be coordinates indicating absolute locations in a picture, and in addition, (dxb, dyb) coordinates, i.e., information indicating a relative location of the upper left sample 1330b of the center coding unit 1320b, and (dxc, dyc) coordinates, i.e., information indicating a relative location of the upper left sample 1330c of the lower coding unit 1320c, may be used based on the location of the upper left sample 1330a of the upper coding unit 1320a. Also, a method of determining a coding unit at a certain location by using, as information indicating locations of samples included in coding units, coordinates of the samples is not limited to the above, and various arithmetic methods capable of using coordinates of samples may be used.

According to an embodiment, the image decoding apparatus 200 may split the current coding unit 1300 into the plurality of coding units 1320a through 1320c, and select a coding unit from the coding units 1320a through 1320c according to a certain standard. For example, the image decoding apparatus 200 may select the coding unit 1320b having a different size from among the coding units 1320a through 1320c.

According to an embodiment, the image decoding apparatus 200 may determine widths or heights of the coding units 1320a through 1320c by respectively using the (xa, ya) coordinates, i.e., the information indicating the location of the upper left sample 1330a of the upper coding unit 1320a, the (xb, yb) coordinates, i.e., the information indicating the location of the upper left sample 1330b of the center coding unit 1320b, and the (xc, yc) coordinates, i.e., the information indicating the location of the upper left sample 1330c of the lower coding unit 1320c. The image decoding apparatus 200 may determine the sizes of the coding units 1320a through 1320c by respectively using the coordinates (xa, ya), (xb, yb), and (xc, yc) indicating the locations of the coding units 1320a through 1320c.

According to an embodiment, the image decoding apparatus 200 may determine the width of the upper coding unit 1320a to be xb-xa, and the height to be yb-ya. According to an embodiment, the image decoding apparatus 200 may determine the width of the center coding unit 1320b to be xc-xb, and the height to be yc-yb. According to an embodiment, the image decoding apparatus 200 may determine the width or height of the lower coding unit 1320c by using the width and height of the current coding unit 1300 and the widths and heights of the upper coding unit 1320a and center coding unit 1320b. The image decoding apparatus 200 may determine a coding unit having a different size from other coding units based on the determined widths and heights of the coding units 1320a through 1320c. Referring to FIG. 13, the image decoding apparatus 200 may determine the center coding unit 1320b having a size different from those of the upper coding unit 1320a and lower coding unit 1320c as a coding unit at a certain location. However, processes of the image decoding apparatus 200 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the image decoding apparatus 200 may select a coding unit at a certain location from among an odd number of coding units determined when a current coding unit is split, while considering a shape of the current coding unit. For example, when the current coding unit has a non-square shape in which a width is longer than a height, the image decoding apparatus 200 may determine a coding unit at a certain location in a horizontal direction. In other words, the image decoding apparatus 200 may determine one of coding units having a different location in the horizontal direction and set a limit on the one coding unit. When the current coding unit has a non-square shape in which a height is longer than a width, the image decoding apparatus 200 may determine a coding unit at a certain location in a vertical direction. In other words, the image decoding apparatus 200 may determine one of coding units having a different location in the vertical direction and set a limit on the one coding unit.

According to an embodiment, the image decoding apparatus 200 may use information indicating a location of each of an even number of coding units so as to determine a coding unit at a certain location from among the even number of coding units. The image decoding apparatus 200 may determine the even number of coding units by splitting a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is split into a plurality of coding units, certain information about a coding unit at a certain location during splitting processes may be used to determine the coding unit at the certain location from among the plurality of coding units. For example, the image decoding apparatus 200 may use at least one of block shape information and split type information stored in a sample included in a center coding unit during splitting processes so as to determine a coding unit located at the center from among a plurality of coding units obtained by splitting a current coding unit.

Referring to FIG. 13, the image decoding apparatus 200 may split the current coding unit 1300 into the plurality of coding units 1320a through 1320c based on at least one of block shape information and split type information, and determine the coding unit 1320b located at the center from among the plurality of coding units 1320a through 1320c. In addition, the image decoding apparatus 200 may determine the coding unit 1320b located at the center considering a location from which at least one of the block shape information and the split type information is obtained. In other words, at least one of the block shape information and the split type information of the current coding unit 1300 may be obtained from the sample 1340 located at the center of the current coding unit 1300, and when the current coding unit 1300 is split into the plurality of coding units 1320a through 1320c based on at least one of the block shape information and the split type information, the coding unit 1320b including the sample 1340 may be determined as a coding unit located at the center. However, information used to determine a coding unit located at the center is not limited to at least one of the block shape information and the split type information, and various types of information may be used while determining a coding unit located at the center.

According to an embodiment, certain information for identifying a coding unit at a certain location may be obtained from a certain sample included in a coding unit to be determined. Referring to FIG. 13, the image decoding apparatus 200 may use at least one of block shape information and split type information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320a through 1320c determined when the current coding unit 1300 is split. In other words, the image decoding apparatus 200 may determine the sample at the certain location considering a block shape of the current coding unit 1300, and determine and set a certain limit on the coding unit 1320b including a sample from which certain information (for example, at least one of block shape information and split type information) is obtainable, from among the plurality of coding units 1320a through 1320c determined when the current coding unit 1300 is split. Referring to FIG. 13, according to an embodiment, the image decoding apparatus 200 may determine, as a sample from which certain information is obtainable, the sample 1340 located at the center of the current coding unit 1300, and set a certain limit on the coding unit 1320b including such a sample 1340 during decoding processes. However, a location of a sample from which certain information is obtainable is not limited to the above, and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the image decoding apparatus 200 may determine, as a sample from which certain information is obtainable, a sample located on a boundary of splitting at least one of a width and a height of a current coding unit into halves by using at least one of information about the width of the current coding unit and information about the height of the current coding unit. As another example, when block shape information related to a current coding unit indicates a non-square shape, the image decoding apparatus 200 may determine, as a sample from which certain information is obtainable, one of samples adjacent to a boundary of splitting long sides of the current coding unit into halves.

According to an embodiment, when a current coding unit is split into a plurality of coding units, the image decoding apparatus 200 may use at least one of block shape information and split type information so as to determine a coding unit at a certain location from among the plurality of coding units. According to an embodiment, the image decoding apparatus 200 may obtain at least one of block shape information and split type information from a sample at a certain location included in a coding unit, and may split a plurality of coding units generated as a current coding unit is split by using at least one of the split type information and the block shape information obtained from the sample at the certain location included in each of the plurality of coding units. In other words, a coding unit may be recursively split by using at least one of block shape information and split type information obtained from a sample at a certain location included in each coding unit. Since processes of recursively splitting a coding unit have been described above with reference to FIG. 12, details thereof are not provided again.

According to an embodiment, the image decoding apparatus 200 may determine at least one coding unit by splitting a current coding unit, and determine an order of decoding the at least one coding unit according to a certain block (for example, the current coding unit).

Figure 14:
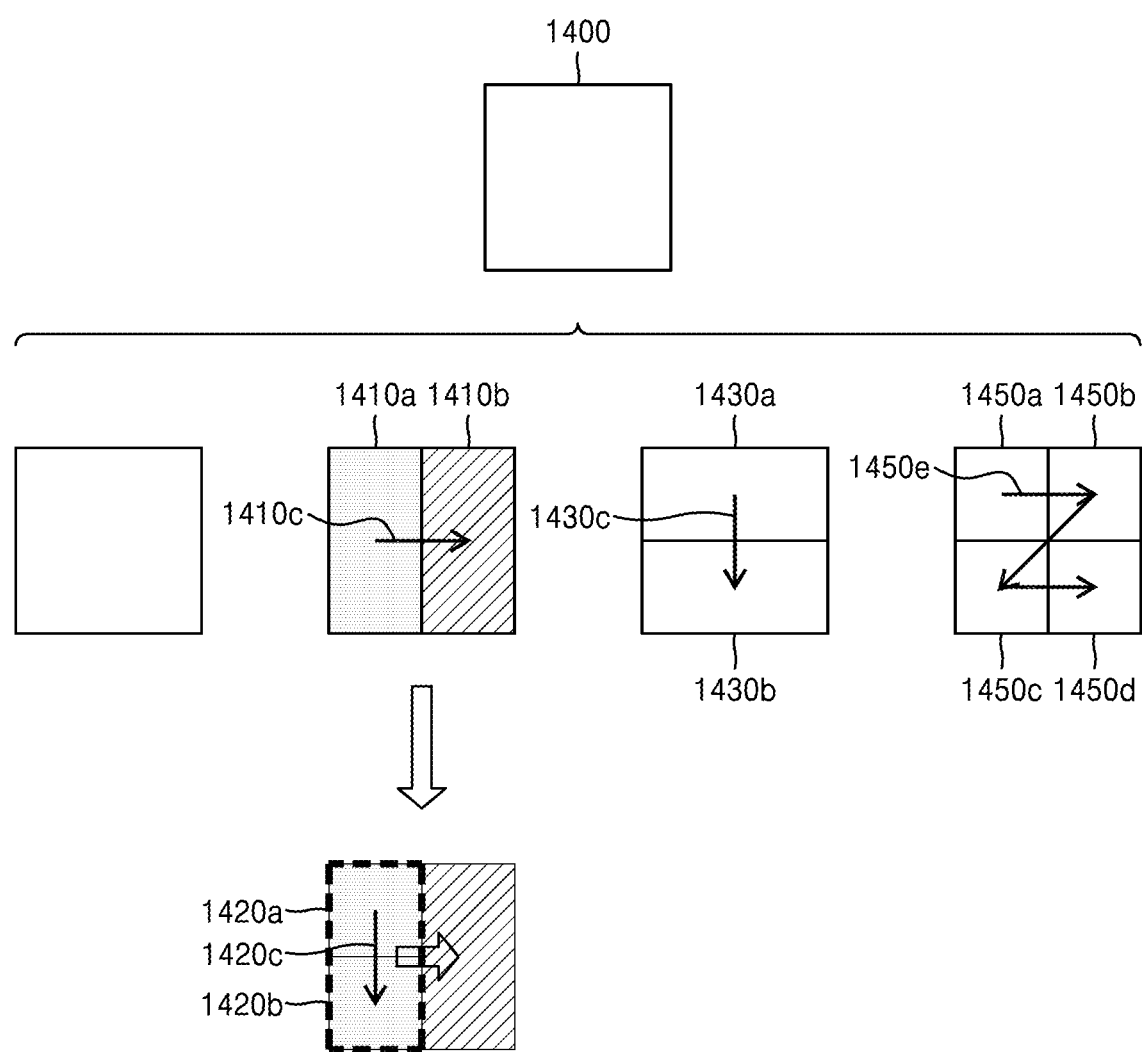
FIG. 14 illustrates an order of processing a plurality of coding units when the plurality of coding units are determined when a current coding unit is split, according to an embodiment.

FIG. 14 illustrates an order of processing a plurality of coding units when the plurality of coding units are determined when the image decoding apparatus 200 splits a current coding unit, according to an embodiment.

According to an embodiment, the image decoding apparatus 200 may determine second coding units 1410*a* and 1410*b* by splitting a first coding unit 1400 in a vertical direction, determine second coding units 1430*a* and 1430*b* by splitting the first coding unit 1400 in a horizontal direction, or determine second coding units 1450*a* through 1450*d* by splitting the first coding unit 140 in horizontal and vertical directions, according to block shape information and split type information.

Referring to FIG. 14, the image decoding apparatus 200 may determine the second coding units 1410*a* and 1410*b*, which are determined by splitting the first coding unit 1400 in the vertical direction, to be processed in a horizontal direction 1410*c*. The image decoding apparatus 200 may determine the second coding units 1430*a* and 1430*b*, which are determined by splitting the first coding unit 1400 in the horizontal direction, to be processed in a vertical direction 1430*c*. The image decoding apparatus 200 may determine the second coding units 1450*a* through 1450*d*, which are determined by splitting the first coding unit 1400 in the vertical and horizontal directions, to be processed) according to a certain order in which coding units located in one row is processed and then coding units located in a next row is processed (for example, a raster scan order or a z-scan order 1450*e*).

According to an embodiment, the image decoding apparatus 200 may recursively split coding units. Referring to FIG. 14, the image decoding apparatus 200 may determine the plurality of second coding units 1410*a* and 1410*b*, 1430*a* and 1430*b*, or 1450*a* through 1450*d* by splitting the first coding unit 1400, and recursively split each of the plurality of second coding units 1410*a* and 1410*b*, 1430*a* and 1430*b*, or 1450*a* through 1450*d*. A method of splitting the plurality of second coding units 1410*a* and 1410*b*, 1430*a* and 1430*b*, or 1450*a* through 1450*d* may correspond to a method of splitting the first coding unit 1400. Accordingly, each of the plurality of second coding units 1410*a* and 1410*b*, 1430*a* and 1430*b*, or 1450*a* through 1450*d* may be independently split into a plurality of coding units. Referring to FIG. 14, the image decoding apparatus 200 may determine the second coding units 1410*a* and 1410*b* by splitting the first coding unit 1400 in the vertical direction, and in addition, determine that each of the second coding units 1410*a* and 1410*b* is independently split or not split.

According to an embodiment, the image decoding apparatus 200 may split the second coding unit 1410*a* at the left in a horizontal direction into third coding units 1420*a* and 1420*b*, and may not split the second coding unit 1410*b* at the right.

According to an embodiment, an order of processing coding units may be determined based on split processes of coding units. In other words, an order of processing coding units that are split may be determined based on an order of processing coding units before being split. The image decoding apparatus 200 may determine an order of processing the third coding units 1420*a* and 1420*b* determined when the second coding unit 1410*a* at the left is split independently from the second coding unit 1410*b* at the right. Since the third coding units 1420*a* and 1420*b* are determined when the second coding unit 1410*a* at the left is split in a horizontal direction, the third coding units 1420*a* and 1420*b* may be processed in a vertical direction 1420*c*. Also, since an order of processing the second coding unit 1410*a* at the left and the second coding unit 1410*b* at the right corresponds to the horizontal direction 1410*c*, the second coding unit 1410*b* at the right may be processed after the third coding units 1420*a* and 1420*b* included in the second coding unit 1410*a* at the left are processed in the vertical direction 1420*c*. The above descriptions are related processes of determining an order of processing coding units according to coding units before being split, but such processes are not limited to the above embodiments, and any method of independently processing, in a certain order, coding units split into various shapes may be used.

Figure 15:
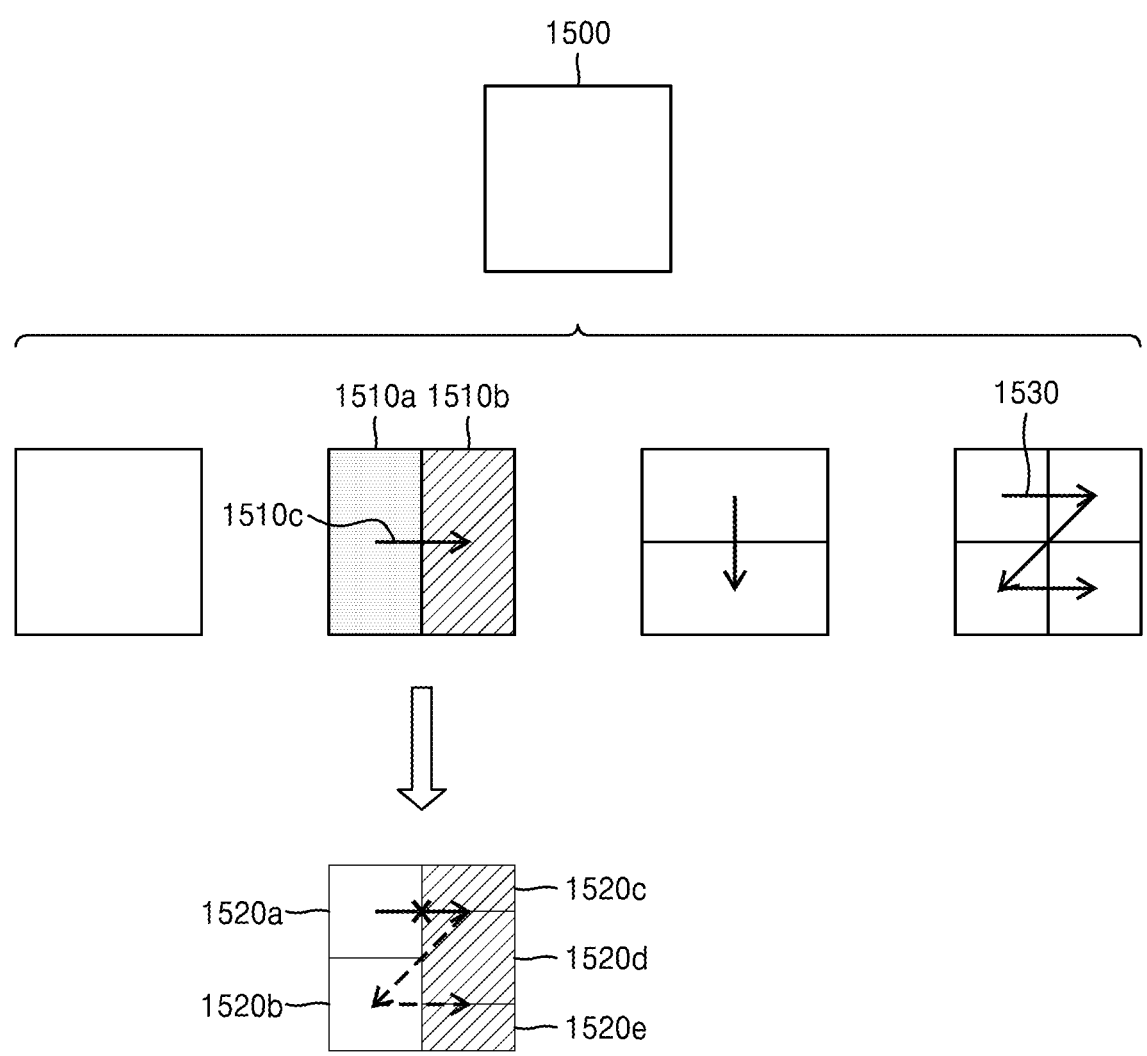
FIG. 15 illustrates processes of determining that a current coding unit is split into an odd number of coding units when coding units are not processable in a predetermined order, according to an embodiment.

FIG. 15 illustrates processes of determining that a current coding unit is split into an odd number of coding units when coding units are not processable in a certain order by the image decoding apparatus 200, according to an embodiment.

According to an embodiment, the image decoding apparatus 200 may determine that a current coding unit is split into an odd number of coding units based on obtained block shape information and split type information. Referring to FIG. 15, a first coding unit 1500 having a square shape may be split into second coding units 1510*a* and 1510*b* having a non-square shape, and the second coding units 1510*a* and 1510*b* may be independently respectively split into third coding units 1520*a* and 1520*b*, and 1520*c* through 1520*e*. According to an embodiment, the image decoding apparatus 200 may split the second coding unit 1510*a* at the left from among the second coding units 1510*a* and 1510*b* into a horizontal direction to determine the plurality of third coding units 1520*a* and 1520*b*, and split the second coding unit 1510*b* at the right into the odd number of third coding units 1520*c* through 1520*e*.

According to an embodiment, the image decoding apparatus 200 may determine whether a coding unit split into an odd number exists by determining whether the third coding units 1520*a* through 1520*e* are processable in a certain order. Referring to FIG. 15, the image decoding apparatus 200 may determine the third coding units 1520*a* through 1520*e* by recursively splitting the first coding unit 1500. The image decoding apparatus 200 may determine, based on at least one of block shape information and split type information, whether a coding unit is split into an odd number from among shapes into which the first coding unit 1500, the second coding units 1510*a* and 1510*b*, or the third coding units 1520*a* through 1520*e* are split. For example, the second coding unit 1510*b* at the right from among the second coding units 1510*a* and 1510*b* may be split into the odd number of third coding units 1520*c* through 1520*e*. An order of processing a plurality of coding units included in the first coding unit 1500 may be a certain order (for example, a z-scan order 1530), and the image decoding apparatus 200 may determine whether the third coding units 1520*c* through 1520*e* determined when the second coding unit 1510*b* at the right is split into an odd number satisfy a condition of being processable according to the certain order.

According to an embodiment, the image decoding apparatus 200 may determine whether the third coding units 1520a through 1520e included in the first coding unit 1500 satisfy a condition of being processable according to a certain order, wherein the condition is related to whether at least one of a width and a height of each of the second coding units 1510a and 1510b is split into halves according to boundaries of the third coding units 1520a through 1520e. For example, the third coding units 1520a and 1520b determined when the height of the second coding unit 1510a at the left and having a non-square shape is split into halves satisfy the condition, but it may be determined that the third coding units 1520c through 1520e do not satisfy the condition because the boundaries of the third coding units 1520c through 1520e that are determined when the second coding unit 1510b at the right is split into three coding units do not split the width or height of the second coding unit 1510b at the right into halves. The image decoding apparatus 200 may determine disconnection of a scan order when the condition is not satisfied, and determine that the second coding unit 1510b at the right is split into the odd number of coding units, based on a result of the determination. According to an embodiment, the image decoding apparatus 200 may set a certain limit on a coding unit at a certain location from among an odd number of coding units obtained by splitting a coding unit, and since such a limit or certain location has been described above through various embodiments, details thereof are not provided again.

Figure 16:
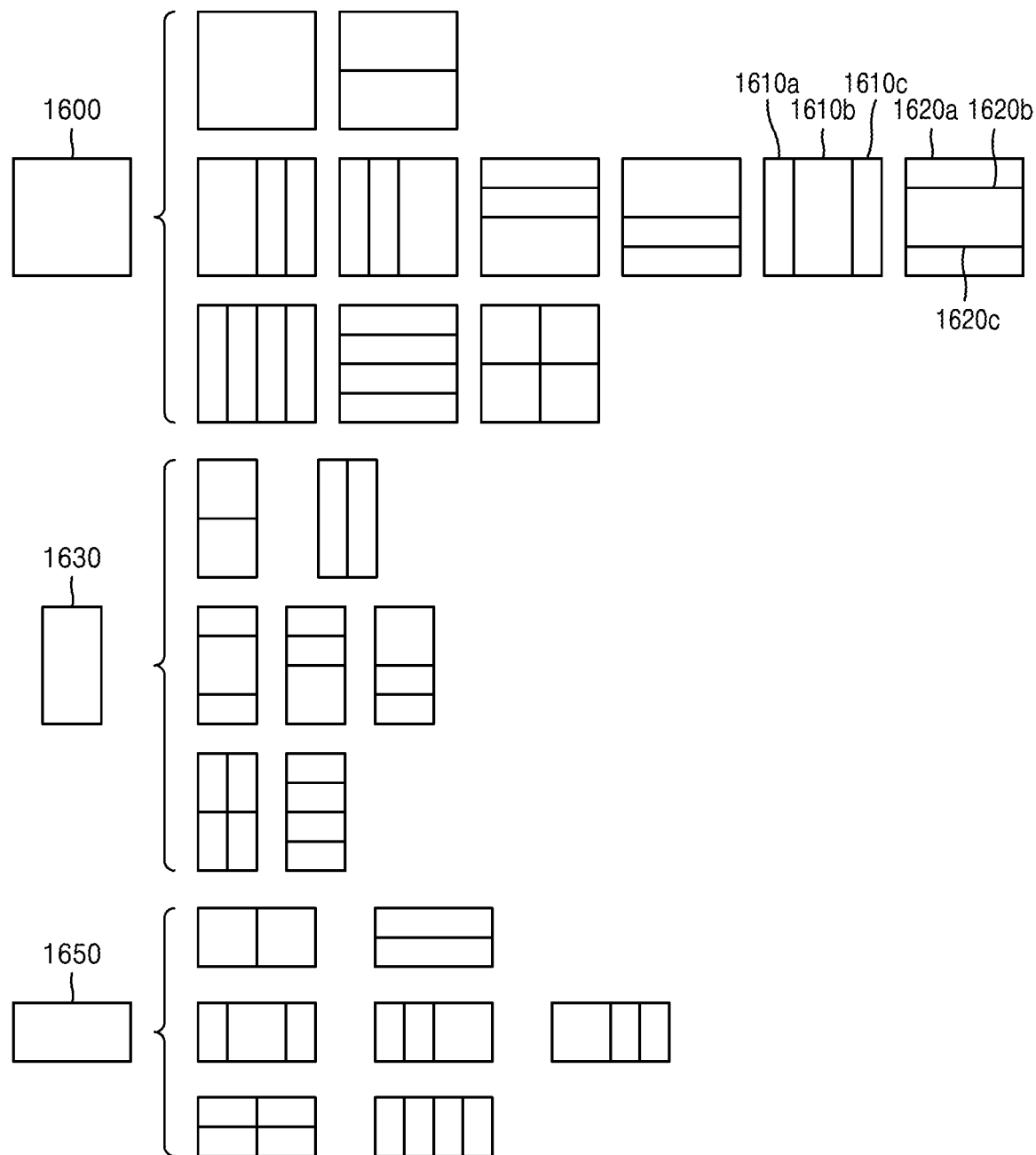
FIG. 16 illustrates processes of determining at least one coding unit when a first coding unit is split, according to an embodiment.

FIG. 16 illustrates processes of determining at least one coding unit when the image decoding apparatus 200 splits a first coding unit 1600, according to an embodiment. According to an embodiment, the image decoding apparatus 200 may split the first coding unit 1600 based on at least one of block shape information and split type information obtained through the receiver 210. The first coding unit 1600 having a square shape may be split into four coding units having a square shape or a plurality of coding units having a non-square shape. For example, referring to FIG. 16, when block shape information indicates that the first coding unit 1600 is a square and split type information indicates a split into non-square coding units, the image decoding apparatus 200 may split the first coding unit 1600 into a plurality of non-square coding units. In detail, when split type information indicates that an odd number of coding units are determined by splitting the first coding unit 1600 in a horizontal direction or a vertical direction, the image decoding apparatus 200 may determine, as the odd number of coding units, second coding units 1610a through 1610c by splitting the first coding unit 1600 having a square shape in a vertical direction, or second coding units 1620a through 1620c by splitting the first coding unit 1600 in a horizontal direction.

According to an embodiment, the image decoding apparatus 200 may determine whether the second coding units 1610a through 1610c and 1620a through 1620c included in the first coding unit 1600 satisfy a condition of being processable in a certain order, wherein the condition is related to whether at least one of a width and a height of the first coding unit 1600 is split into halves according to boundaries of the second coding units 1610a through 1610c and 1620a through 1620c. Referring to FIG. 16, since the boundaries of the second coding units 1610a through 1610c determined when the first coding unit 1600 having a square shape is split in a vertical direction do not split the width of the first coding unit 1600 into halves, it may be determined that the first coding unit 1600 does not satisfy the condition of being processable in a certain order. Also, since the boundaries of the second coding units 1620a through 1620c determined when the first coding unit 1600 having a square shape is split in a horizontal direction do not split the height of the first coding unit 1600 into halves, it may be determined that the first coding unit 1600 does not satisfy the condition of being processable in a certain order. The image decoding apparatus 200 may determine disconnection of a scan order when the condition is not satisfied, and determine that the first coding unit 1600 is split into the odd number of coding units based on a result of the determination. According to an embodiment, the image decoding apparatus 200 may set a certain limit on a coding unit at a certain location from among an odd number of coding units obtained by splitting a coding unit, and since such a limit or certain location has been described above through various embodiments, details thereof are not provided again.

According to an embodiment, the image decoding apparatus 200 may determine coding units having various shapes by splitting a first coding unit.

Referring to FIG. 16, the image decoding apparatus 200 may split the first coding unit 1600 having a square shape and a first coding unit 1630 or 1650 having a non-square shape into coding units having various shapes.

Figure 17:
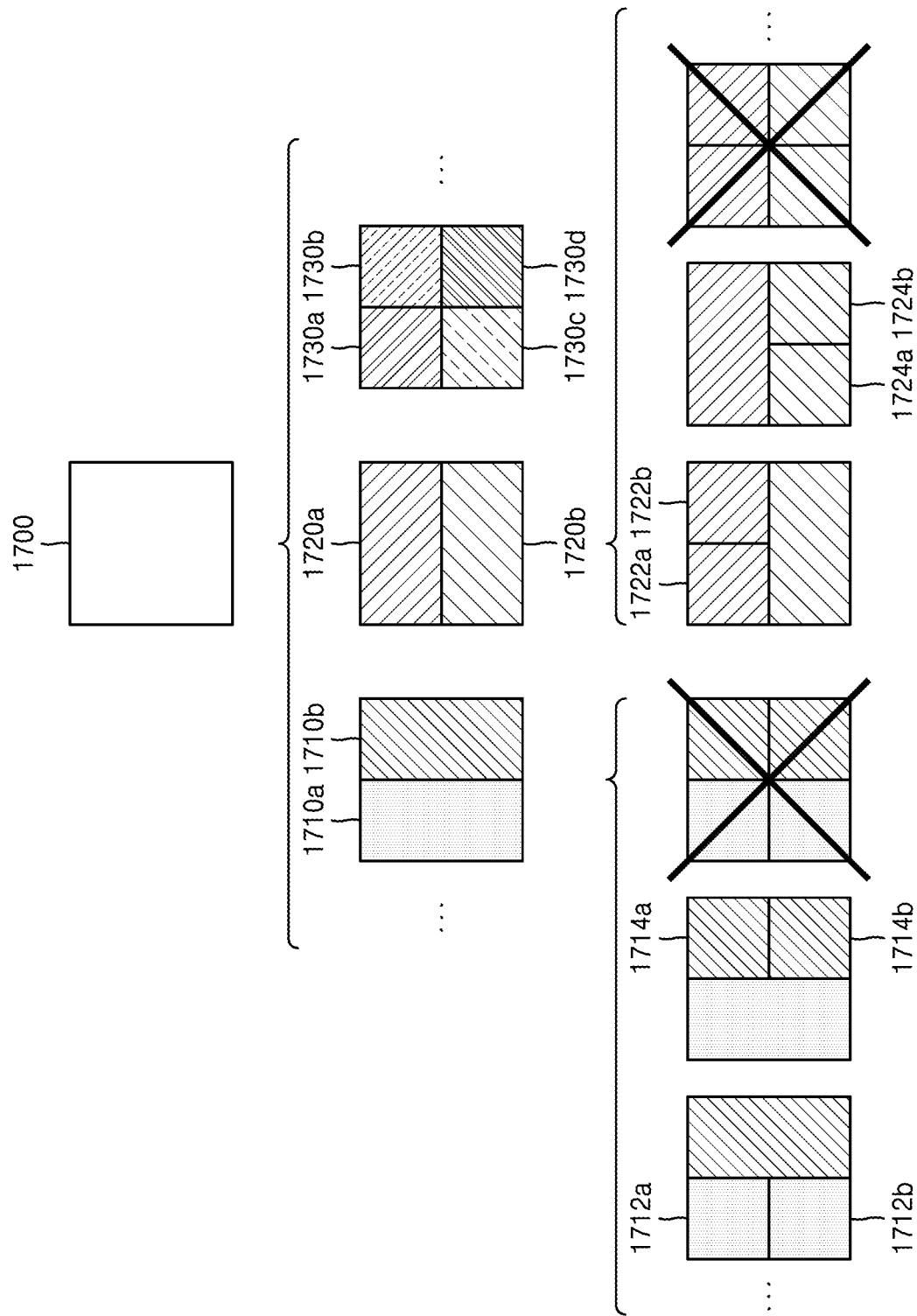
FIG. 17 illustrates that a shape into which a second coding unit is splittable is restricted when the second coding unit having a non-square shape determined when a first coding unit is split satisfies a predetermined condition, according to an embodiment.

FIG. 17 illustrates that a shape into which a second coding unit is splittable by the image decoding apparatus 200 is restricted when the second coding unit having a non-square shape determined when a first coding unit 1700 is split satisfies a certain condition, according to an embodiment.

According to an embodiment, the image decoding apparatus 200 may determine that the first coding unit 1700 having a square shape is split into second coding units 1710a and 1710b or 1720a and 1720b having a non-square shape, based on at least one of block shape information and split type information obtained through the receiver 210. The second coding units 1710a and 1710b or 1720a and 1720b may be independently split. Accordingly, the image decoding apparatus 200 may determine that the second coding units 1710a and 1710b or 1720a and 1720b are split into a plurality of coding units or are not split based on at least one of block shape information and split type information related to each of the coding units 1710a and 1710b or 1720a and 1720b. According to an embodiment, the image decoding apparatus 200 may determine third coding units 1712a and 1712b by splitting, in a horizontal direction, the second coding unit 1710a at the left having a non-square shape, which is determined when the first coding unit 1700 is split in a vertical direction. However, when the second coding unit 1710a at the left is split in the horizontal direction, the image decoding apparatus 200 may set a limit that the second coding unit 1710b at the right is not split in the horizontal direction like the second coding unit 1710a at the left. When third coding units 1714a and 1714b are determined when the second coding unit 1710b at the right is split in the same direction, i.e., the horizontal direction, the third coding units 1712a, 1712b, 1714a, and 1714b are determined when the second coding units 1710a at the left and the second coding unit 1710b at the right are each independently split in the horizontal direction. However, this is the same result as splitting the first coding unit 1700 into four second coding units 1730a through 1730d having a square shape based on at least one of block shape information and split type information, and thus may be inefficient in terms of image decoding.

According to an embodiment, the image decoding apparatus 200 may determine third coding units 1722a and 1722b or 1724*a*, and 1724*b* by splitting, in a vertical direction, the second coding unit 1720*a* or 1720*b* having a non-square shape determined when the first coding unit 1700 is split in the horizontal direction. However, when one of second coding units (for example, the second coding unit 1720*a* at the top) is split in a vertical direction, the image decoding apparatus 200 may set a limit that the other second coding unit (for example, the second coding unit 1720*b* at the bottom) is not split in the vertical direction like the second coding unit 1720*a* at the top for the above described reasons.

Figure 18:
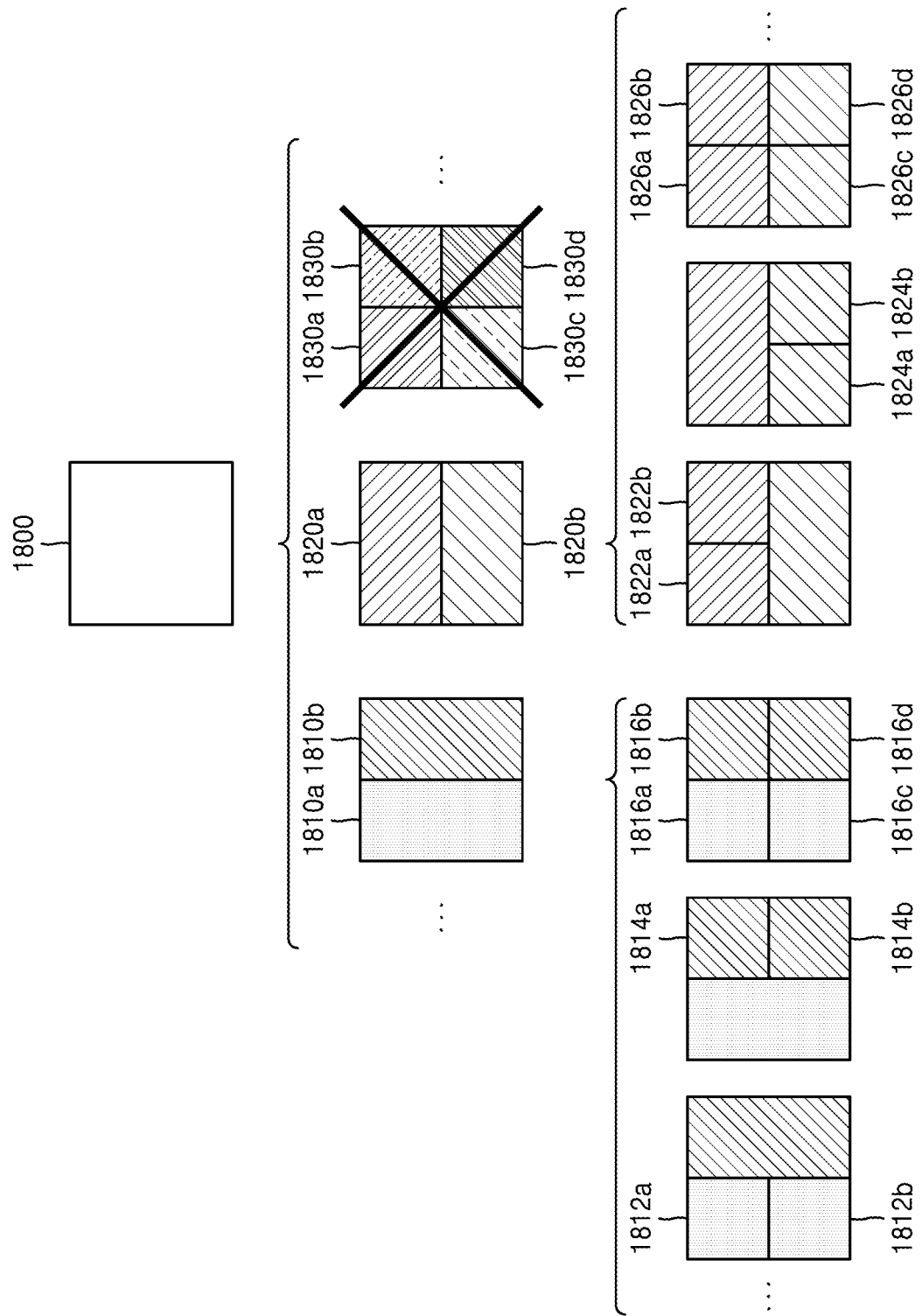
FIG. 18 illustrates processes of splitting a coding unit having a square shape when split type information is unable to indicate that a coding unit is split into four square shapes, according to an embodiment.

FIG. 18 illustrates processes of the image decoding apparatus 200 splitting a coding unit having a square shape when split type information is unable to indicate that a coding unit is split into four square shapes, according to an embodiment.

According to an embodiment, the image decoding apparatus 200 may determine second coding units 1810*a* and 1810*b*, or 1820*a* and 1820*b*, by splitting a first coding unit 1800 based on at least one of block shape information and split type information. Split type information may include information about various shapes into which a coding unit may be split, but such information about various shapes may not include information for splitting a coding unit into four square coding units. According to such split type information, the image decoding apparatus 200 is unable to split the first coding unit 1800 having a square shape into four second coding units 1830 through 1830*d* having a square shape. The image decoding apparatus 200 may determine the second coding units 1810*a* and 1810*b*, or 1820*a* and 1820*b* having a non-square shape based on the split type information.

According to an embodiment, the image decoding apparatus 200 may independently split each of the second coding units 1810*a* and 1810*b*, or 1820*a* and 1820*b* having a non-square shape. Each of the second coding units 1810*a* and 1810*b*, or 1820*a* and 1820*b* may be split in a certain order via a recursive method that may be a split method corresponding to a method of splitting the first coding unit 1800 based on at least one of the block shape information and the split type information.

For example, the image decoding apparatus 200 may determine third coding units 1812*a* and 1812*b* having a square shape by splitting the second coding unit 1810*a* at the left in a horizontal direction, or determine third coding units 1814*a* and 1814*b* having a square shape by splitting the second coding unit 1810*b* at the right in a horizontal direction. In addition, the image decoding apparatus 200 may determine third coding units 1816*a* through 1816*d* having a square shape by splitting both the second coding unit 1810*a* at the left and the second coding unit 1810*b* at the right in the horizontal direction. In this case, coding units may be determined in the same manner as when the first coding unit 1800 is split into four second coding units 1830*a* through 1830*d* having a square shape.

As another example, the image decoding apparatus 200 may determine third coding units 1822*a* and 1822*b* having a square shape by splitting the second coding unit 1820*a* at the top in a vertical direction, and determine third coding units 1824*a* and 1824*b* having a square shape by splitting the second coding unit 1820*b* at the bottom in a vertical direction. In addition, the image decoding apparatus 200 may determine third coding units 1826*a* through 1826*d* having a square shape by splitting both the second coding unit 1820*a* at the top and the second coding unit 1820*b* at the bottom in the vertical direction. In this case, coding units may be determined in the same manner as when the first coding unit 1800 is split into four second coding units 1830*a* through 1830*d* having a square shape.

Figure 19:
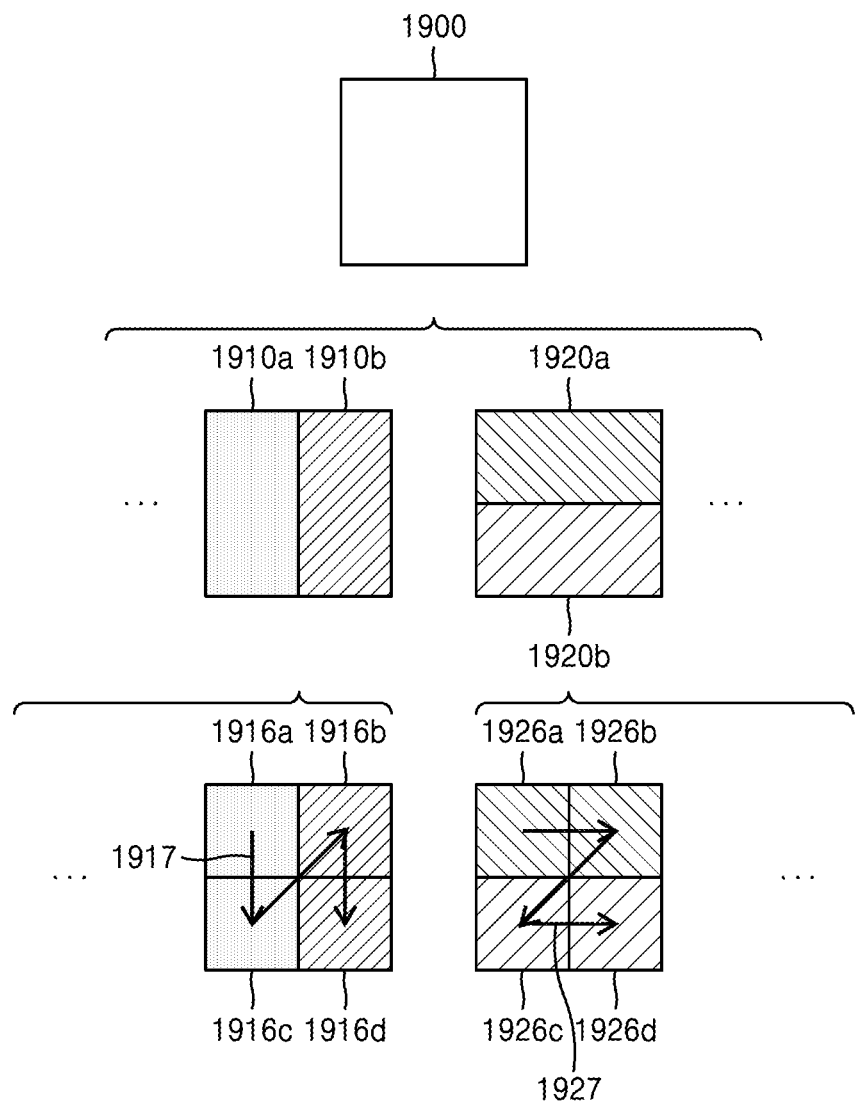
FIG. 19 illustrates that an order of processing a plurality of coding units may be changed according to processes of splitting a coding unit, according to an embodiment.

FIG. 19 illustrates that an order of processing a plurality of coding units may be changed according to processes of splitting a coding unit, according to an embodiment.

According to an embodiment, the image decoding apparatus 200 may split a first coding unit 1900 based on block shape information and split type information. When the block shape information indicates a square shape and the split type information indicates that the first coding unit 1900 is split in at least one of a horizontal direction and a vertical direction, the image decoding apparatus 200 may split the first coding unit 1900 to determine second coding units 1910*a* and 1910*b*, or 1920*a* and 1920*b*. Referring to FIG. 19, the second coding units 1910*a* and 1910*b*, or 1920*a* and 1920*b* having a non-square shape and determined when the first coding unit 1900 is split in the horizontal direction or the vertical direction may each be independently split based on block shape information and split type information. For example, the image decoding apparatus 200 may determine third coding units 1916*a* through 1916*d* by splitting, in the horizontal direction, each of the second coding units 1910*a* and 1910*b* generated as the first coding unit 1900 is split in the vertical direction, or determine third coding units 1926*a* through 1926*d* by splitting, in the horizontal direction, the second coding units 1920*a* and 1920*b* generated as the first coding unit 1900 is split in the horizontal direction. Processes of splitting the second coding units 1910*a* and 1910*b*, or 1920*a* and 1920*b* have been described above with reference to FIG. 17, and thus details thereof are not provided again.

According to an embodiment, the image decoding apparatus 200 may process coding units according to a certain order. Features about processing coding units according to a certain order have been described above with reference to FIG. 14, and thus details thereof are not provided again. Referring to FIG. 19, the image decoding apparatus 200 may determine four third coding units 1916*a* through 1916*d* or 1926*a* through 1926*d* having a square shape by splitting the first coding unit 1900 having a square shape. According to an embodiment, the image decoding apparatus 200 may determine an order of processing the third coding units 1916*a* through 1916*d* or 1926*a* through 1926*d* based on how the first coding unit 1900 is split.

According to an embodiment, the image decoding apparatus 200 may determine the third coding units 1916*a* through 1916*d* by splitting, in the horizontal direction, the second coding units 1910*a* and 1910*b* generated as the first coding unit 1900 is split in the vertical direction, and process the third coding units 1916*a* through 1916*d* according to an order 1917 of first processing, in the vertical direction, the third coding units 1916*a* and 1916*b* included in the second coding unit 1910*a* at the left, and then processing, in the vertical direction, the third coding units 1916*c* and 1916*d* included in the second coding unit 1910*b* at the right.

According to an embodiment, the image decoding apparatus 200 may determine the third coding units 1926*a* through 1926*d* by splitting, in the vertical direction, the second coding units 1920*a* and 1920*b* generated as the first coding unit 1900 is split in the horizontal direction, and process the third coding units 1926*a* through 1926*d* according to an order 1927 of first processing, in the horizontal direction, the third coding units 1926*a* and 1926*b* included in the second coding unit 1920*a* at the top, and then processing, in the horizontal direction, the third coding units 1926*c* and 1926*d* included in the second coding unit 1920*b* at the bottom.

Referring to FIG. 19, the third coding units 1916*a* through 1916*d* or 1926*a* through 1926*d* having a square shape may be determined when the second coding units 1910*a* and 1910*b*, or 1920*a* and 1920*b* are each split. The second coding units 1910*a* and 1910*b* determined when the first coding unit 1900 is split in the vertical direction and the second coding units 1920*a* and 1920*b* determined when the first coding unit 1900 is split in the horizontal direction are split in different shapes, but according to the third coding units 1916*a* through 1916*d* and 1926*a* through 1926*d* determined afterwards, the first coding unit 1900 is split in coding units having same shapes. Accordingly, the image decoding apparatus 200 may process pluralities of coding units determined in same shapes in different orders even when the coding units having the same shapes are consequently determined when coding units are recursively split through different processes based on at least one of block shape information and split type information.

FIG. 20 illustrates processes of determining a depth of a coding unit as a shape and size of the coding unit are changed, when a plurality of coding units are determined when the coding unit is recursively split, according to an embodiment.

According to an embodiment, the image decoding apparatus 200 may determine a depth of a coding unit according to a certain standard. For example, the certain standard may be a length of a long side of the coding unit. When a length of a long side of a current coding unit is split $2n$ times shorter than a length of a long side of a coding unit before being split, it may be determined that a depth of the current coding unit is increased n times a depth of the coding unit before being split, wherein n>0. Hereinafter, a coding unit having an increased depth is referred to as a coding unit of a lower depth.

Referring to FIG. 20, the image decoding apparatus 200 may determine a second coding unit 2002 and a third coding unit 2004 of lower depths by splitting a first coding unit 2000 having a square shape, based on block shape information indicating a square shape (for example, block shape information may indicate '0:SQURE'), according to an embodiment. When a size of the first coding unit 2000 having a square shape is 2N×2N, the second coding unit 2002 determined by splitting a width and a height of the first coding unit 2000 by $½^1$ may have a size of N×N. In addition, the third coding unit 2004 determined by splitting a width and a height of the second coding unit 2002 by ½ may have a size of N/2×N/2. In this case, a width and a height of the third coding unit 2004 corresponds to $½^2$ of the first coding unit 2000. When a depth of first coding unit 2000 is D, a depth of the second coding unit 2002 having $½^1$ of the width and the height of the first coding unit 2000 may be D+1, and a depth of the third coding unit 2004 having $½^2$ of the width and the height of the first coding unit 2000 may be D+2.

According to an embodiment, the image decoding apparatus 200 may determine a second coding unit 2012 or 2022 and a third coding unit 2014 or 2024 by splitting a first coding unit 2010 or 2020 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The image decoding apparatus 200 may determine a second coding unit (for example, the second coding unit 2002, 2012, or 2022) by splitting at least one of a width and a height of the first coding unit 2010 having a size of N×2N. In other words, the image decoding apparatus 200 may determine the second coding unit 2002 having a size of N×N or the second coding unit 2022 having a size of N×N/2 by splitting the first coding unit 2010 in a horizontal direction, or determine the second coding unit 2012 having a size of N/2×N by splitting the first coding unit 2010 in horizontal and vertical directions.

The image decoding apparatus 200 may determine a second coding unit (for example, the second coding unit 2002, 2012, or 2022) by splitting at least one of a width and a height of the first coding unit 2020 having a size of 2N×N. In other words, the image decoding apparatus 200 may determine the second coding unit 2002 having a size of N×N or the second coding unit 2012 having a size of N/2×N by splitting the first coding unit 2020 in a vertical direction, or determine the second coding unit 2022 having a size of N×N/2 by splitting the first coding unit 2010 in horizontal and vertical directions.

According to an embodiment, the image decoding apparatus 200 may determine a third coding unit (for example, the third coding unit 2004, 2014, or 2024) by splitting at least one of a width and a height of the second coding unit 2002 having a size of N×N. In other words, the image decoding apparatus 200 may determine the third coding unit 2004 having a size of N/2×N/2, the third coding unit 2014 having a size of $N/2^2$×N/2, or the third coding unit 2024 having a size of $N/2$×$N/2^2$ by splitting the second coding unit 2002 in vertical and horizontal directions.

According to an embodiment, the image decoding apparatus 200 may determine a third coding unit (for example, the third coding unit 2004, 2014, or 2024) by splitting at least one of a width and a height of the second coding unit 2022 having a size of N/2×N. In other words, the image decoding apparatus 200 may determine the third coding unit 2004 having a size of N/2×N/2 or the third coding unit 2024 having a size of $N/2$×$N/2^2$ by splitting the second coding unit 2012 in a horizontal direction, or the third coding unit 2014 having a size of $N/2^2$×N/2 by splitting the second coding unit 2012 in vertical and horizontal directions.

According to an embodiment, the image decoding apparatus 200 may determine a third coding unit (for example, the third coding unit 2004, 2014, or 2024) by splitting at least one of a width and a height of the second coding unit 2022 having a size of N×N/2. In other words, the image decoding apparatus 200 may determine the third coding unit 2004 having a size of N/2×N/2 or the third coding unit 2014 having a size of $N/2^2$×N/2 by splitting the second coding unit 2022 in a vertical direction, or the third coding unit 2024 having a size of $N/2$×$N/2^2$ by splitting the second coding unit 2022 in vertical and horizontal directions.

According to an embodiment, the image decoding apparatus 200 may split a coding unit (for example, the first, second, or third coding unit 2000, 2002, or 2004) having a square shape in a horizontal or vertical direction. For example, the first coding unit 2010 having a size of N×2N may be determined by splitting the first coding unit 2000 having a size of 2N×2N in the vertical direction, or the first coding unit 2020 having a size of 2N×N may be determined by splitting the first coding unit 2000 in the horizontal direction. According to an embodiment, when a depth is determined based on a length of a longest side of a coding unit, a depth of a coding unit determined when the first coding unit 2000 having a size of 2N×2N is split in a horizontal or vertical direction may be the same as a depth of the first coding unit 2000.

According to an embodiment, the width and the height of the third coding unit 2014 or 2024 may be $½^2$ of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is ½² of the width and the height of the first coding unit 2010 or 202 may be D+2.

Figure 21:
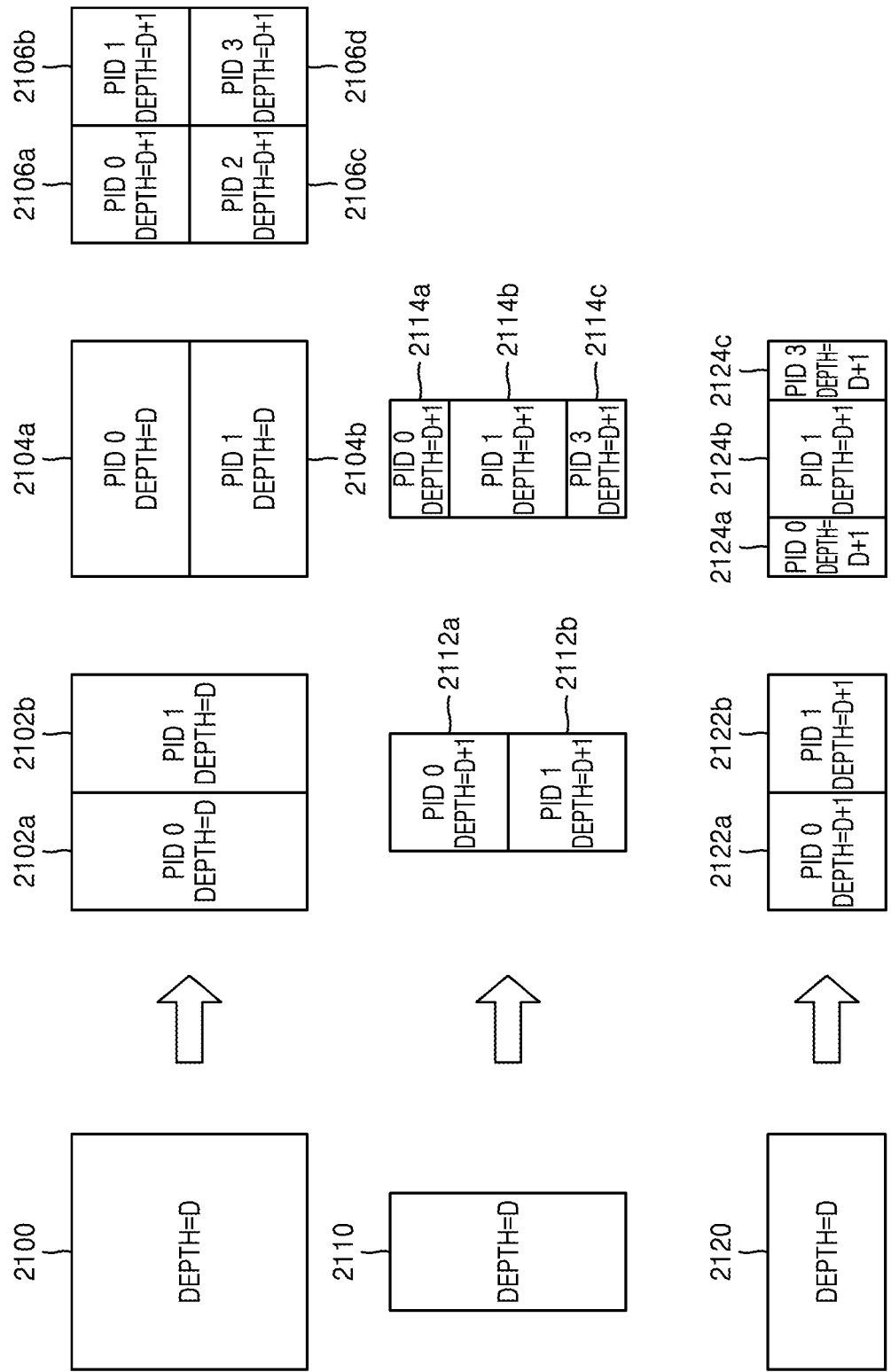
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the image decoding apparatus 200 may determine a second coding unit having various shapes by splitting a first coding unit 2100 having a square shape. Referring to FIG. 21, the image decoding apparatus 200 may determine second coding units 2102a and 2102b, 2104a and 2104b, or 2106a through 2106d by splitting the first coding unit 2100 in at least one of a vertical direction and a horizontal direction, according to split type information. In other words, the image decoding apparatus 200 may determine the second coding units 2102a and 2102b, 2104a and 2104b, or 2106a through 2106d based on split type information of the first coding unit 2100.

According to an embodiment, a depth of the second coding units 2102a and 2102b, 2104a and 2104b, or 2106a through 2106d determined according to the split type information of the first coding unit 2100 having a square shape may be determined based on a length of a long side. For example, since a length of one side of the first coding unit 2100 having a square shape is the same as a length of a long side of the second coding units 2102a and 2102b or 2104a and 2104b having a non-square shape, the depths of the first coding unit 2100 and the second coding units 2102a and 2102b or 2104a and 2104b having a non-square shape may be the same, i.e., D. On the other hand, when the image decoding apparatus 200 splits the first coding unit 2100 into the four second coding units 2106a through 2106d having a square shape, based on the split type information, a length of one side of the second coding units 2106a through 2106d having a square shape is ½ of the length of one side of the first coding unit 2100, the depths of the second coding units 2106a through 2106d may be D+1, i.e., a depth lower than the depth D of the first coding unit 2100. According to an embodiment, the image decoding apparatus 200 may split a first coding unit 2110, in which a height is longer than a width, in a horizontal direction into a plurality of second coding units 2112a and 2112b or 2114a through 2114c, according to split type information. According to an embodiment, the image decoding apparatus 200 may split a first coding unit 2120, in which a width is longer than a height, in a vertical direction into a plurality of second coding units 2122a and 2122b or 2124a through 2124c, according to split type information.

According to an embodiment, depths of the second coding units 2112a and 2112b, 2114a through 2114c, 2122a and 2122b, or 2124a through 2124c determined according to the split type information of the first coding unit 2110 or 2120 having a non-square shape may be determined based on a length of a long side. For example, since a length of one side of the second coding units 2112a and 2112b having a square shape is ½ of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the image decoding apparatus 200 may split the first coding unit 2110 having a non-square shape into an odd number of second coding units 2114a through 2114c, based on split type information. The odd number of second coding units 2114a through 2114c may include the second coding units 2114a and 2114c having a non-square shape, and the second coding unit 2114b having a square shape. In this case, since a length of a long side of the second coding units 2114a and 2114c having a non-square shape and a length of one side of the second coding unit 2114b having a square shape are ½ of a length of one side of the first coding unit 2110, depths of the second coding units 2114a through 2114b may be D+1, i.e., a depth lower than the depth D of the first coding unit 2110. The image decoding apparatus 200 may determine depths of coding units related to the first coding unit 2120 having a non-square shape in which a width is longer than a height, in the same manner as the determining of depths of coding units related to the first coding unit 2110.

According to an embodiment, with respect to determining PIDs for distinguishing coding units, when an odd number of coding units do not have the same size, the image decoding apparatus 200 may determine PIDs based on a size ratio of the coding units. Referring to FIG. 21, the second coding unit 2114b located at the center from the odd number of second coding units 2114a through 2114c may have the same width as the second coding units 2114a and 2114c, but have a height twice higher than those of the second coding units 2114a and 2114c. In this case, the second coding unit 2114b located at the center may include two of the second coding units 2114a and 2114c. Accordingly, when the PID of the second coding unit 2114b located at the center is 1 according to a scan order, the PID of the second coding unit 2114c in a next order may be 3, the PID having increased by 2. In other words, values of the PID may be discontinuous. According to an embodiment, the image decoding apparatus 200 may determine whether an odd number of coding units have the same sizes based on discontinuity of PID for distinguishing the coding units.

According to an embodiment, the image decoding apparatus 200 may determine whether a plurality of coding units determined when a current coding unit is split have certain split shapes based on values of PID. Referring to FIG. 21, the image decoding apparatus 200 may determine the even number of second coding units 2112a and 211b or the odd number of second coding units 2114a through 2114c by splitting the first coding unit 2110 having a rectangular shape in which the height is longer than the width. The image decoding apparatus 200 may use the PID indicating each coding unit so as to distinguish a plurality of coding units. According to an embodiment, a PID may be obtained from a sample at a certain location (for example, an upper left sample) of each coding unit.

According to an embodiment, the image decoding apparatus 200 may determine a coding unit at a certain location from among coding units determined by using PIDs for distinguishing coding units. According to an embodiment, when split type information of the first coding unit 2110 having a rectangular shape in which a height is longer than a width indicates that the first coding unit 2110 is split into three coding units, the image decoding apparatus 200 may split the first coding unit 2110 into the three second coding units 2114a through 2114c. The image decoding apparatus 200 may assign a PID to each of the three second coding units 2114a through 2114c. The image decoding apparatus 200 may compare PIDs of an odd number of coding units so as to determine a center coding unit from among the coding units. The image decoding apparatus 200 may determine, as a coding unit at a center location from among coding units determined when the first coding unit 2110 is split, the second coding unit 2114b having a PID corresponding to a center value from among PIDs, based on PIDs of the coding units. According to an embodiment, while determining PIDs for distinguishing coding units, when the coding units do not have the same sizes, the image decoding apparatus 200 may determine PIDs based on a size ratio of the coding units. Referring to FIG. 21, the second coding unit 2114b generated when the first coding unit 2110 is split may have the same width as the second coding units 2114a and 2114c, but may have a height twice higher than those of the second coding units 2114a and 2114c. In this case, when the PID of the second coding unit 2114b located at the center is 1, the PID of the second coding unit 2114c in a next order may be 3, the PID having increased by 2. As such, when an increasing range of PIDs differs while uniformly increasing, the image decoding apparatus 200 may determine that a current coding unit is split into a plurality of coding units including a coding unit having a different size from other coding units. According to an embodiment, when split type information indicates splitting into an odd number of coding units, the image decoding apparatus 200 may split a current coding unit into a plurality of coding units, in which a coding unit at a certain location (for example, a center coding unit) has a size different from other coding units. In this case, the image decoding apparatus 200 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the image decoding apparatus 200 may use a certain data unit from which recursive splitting of a coding unit is started.

Figure 22:
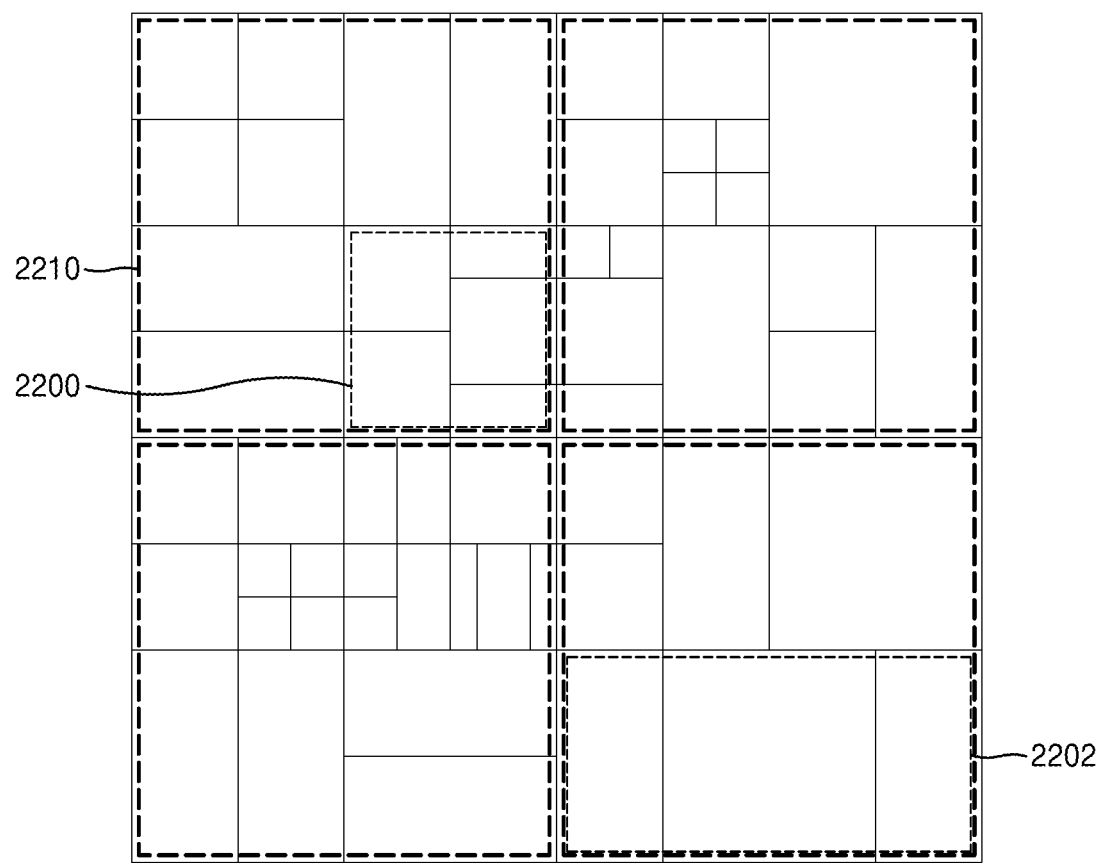
FIG. 22 illustrates that a plurality of coding units are determined according to a plurality of predetermined data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively split by using at least one of block shape information and split type information. In other words, the certain data unit may correspond to a coding unit of an uppermost depth used while determining a plurality of coding units by splitting a current picture. Hereinafter, the certain data unit is referred to as a reference data unit for convenience of description.

According to an embodiment, the reference data unit may indicate a certain size and shape. According to an embodiment, the reference data unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the image decoding apparatus 200 may split a current picture into a plurality of reference data units. According to an embodiment, the image decoding apparatus 200 may split the plurality of reference data units obtained by splitting the current picture by using split type information about each of the reference data units. Split processes of such reference data units may correspond to split processes using a quad-tree structure.

According to an embodiment, the image decoding apparatus 200 may pre-determine a smallest size available for the reference data unit included in the current picture. Accordingly, the image decoding apparatus 200 may determine the reference data unit having various sizes that are equal to or larger than the smallest size, and determine at least one coding unit based on the determined reference data unit by using block shape information and split type information.

Referring to FIG. 22, the image decoding apparatus 200 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the receiver 210 of the image decoding apparatus 200 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of splitting the current coding unit 1000 of FIG. 10, and processes of determining at least one coding unit included in the reference coding unit 2200 having a non-square shape have been described above through processes of splitting the current coding unit 1100 or 1150 of FIG. 11, and thus details thereof are not provided again.

According to an embodiment, in order to determine a size and shape of a reference coding unit according to some data units pre-determined based on a predetermined condition, the image decoding apparatus 200 may use a PID for distinguishing the size and shape of the reference coding unit. In other words, the receiver 210 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 200 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. In other words, the image decoding apparatus 200 may select at least one of the pre-determined size and shape of the reference coding unit according to the PID so as to determine at least one of the size and shape of the reference coding unit included in a data unit that is a criterion for obtaining the PID.

According to an embodiment, the image decoding apparatus 200 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the image decoding apparatus 200 may determine a reference coding unit by splitting a largest coding unit n times according to a quad-tree structure, and split the reference coding unit based on at least one of block shape information and split type information according to various embodiments.

Figure 23:
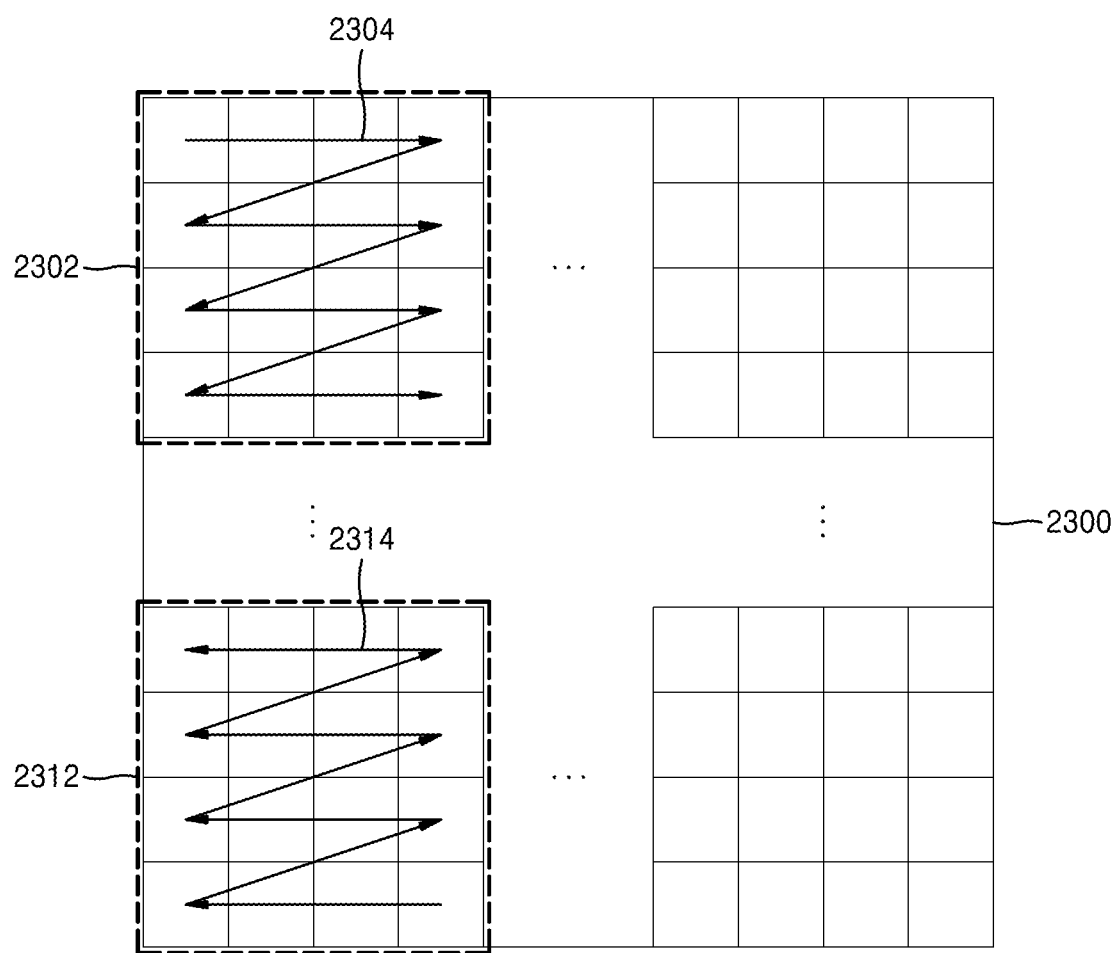
FIG. 23 illustrates a processing block serving as a criterion of determining a determination order of reference coding units included in a picture, according to an embodiment.

FIG. 23 illustrates a processing block serving as a criterion of determining a determination order of reference coding units included in a picture 2300, according to an embodiment.

According to an embodiment, the image decoding apparatus 200 may determine at least one processing block splitting a picture. A processing block is a data unit including at least one reference coding unit splitting an image, and the at least one reference coding unit included in the processing block may be determined in a certain order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the image decoding apparatus 200 may determine a size of at least one processing block included in an image by obtaining information about a size of a processing block. The image decoding apparatus 200 may obtain, from a bitstream, the information about a size of a processing block to determine the size of the at least one processing block included in the image. The size of the processing block may be a certain size of a data unit indicated by the information about a size of a processing block.

According to an embodiment, the receiver 210 of the image decoding apparatus 200 may obtain, from the bitstream, the information about a size of a processing block according to certain data units. For example, the information about a size of a processing block may be obtained from the bitstream in data units of images, sequences, pictures, slices, and slice segments. In other words, the receiver 210 may obtain, from the bitstream, the information about a size of a processing block according to such several data units, and the image decoding apparatus 200 may determine the size of at least one processing block splitting the picture by using the obtained information about a size of a processing block, wherein the size of the processing block may be an integer times a size of a reference coding unit.

According to an embodiment, the image decoding apparatus 200 may determine sizes of processing blocks 2302 and 2312 included in the picture 2300. For example, the image decoding apparatus 200 may determine a size of a processing block based on information about a size of a processing block, the information being obtained from a bitstream. Referring to FIG. 23, the image decoding apparatus 200 may determine horizontal sizes of the processing blocks 2302 and 2312 to be four times a horizontal size of a reference coding unit, and a vertical size thereof to be four times a vertical size of the reference coding unit, according to an embodiment. The image decoding apparatus 200 may determine a determining order of at least one reference coding unit in at least one processing block.

According to an embodiment, the image decoding apparatus 200 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining a size of the reference coding unit.

According to an embodiment, the image decoding apparatus 200 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding apparatus 200 may obtain, from a bitstream, information about a determining order of a reference coding unit according to certain data units. For example, the receiver 210 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding apparatus 200 may determine at least one reference coding unit based on the determined order.

According to an embodiment, the receiver 210 may obtain, from the bitstream, information about a determining order of a reference coding unit, as information related to the processing blocks 2302 and 2312, and the image decoding apparatus 200 may determine an order of determining at least one reference coding unit included in the processing blocks 2302 and 2312 and determine at least one reference coding unit included in the picture 2300 according to a determining order of a coding unit. Referring to FIG. 23, the image decoding apparatus 200 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The image decoding apparatus 200 may decode determined at least one reference coding unit, according to an embodiment. The image decoding apparatus 200 may decode an image based on reference coding units determined through above embodiments. Examples of a method of decoding a reference coding unit may include various methods of decoding an image.

According to an embodiment, the image decoding apparatus 200 may obtain, from a bitstream, and use block shape information indicating a shape of a current coding unit or split type information indicating a method of splitting the current coding unit. The block shape information or the split type information may be included in a bitstream related to various data units. For example, the image decoding apparatus 200 may use the block shape information or split type information, which is included in a sequence parameter set, a picture parameter set, a video parameter set, a slice header, and a slice segment header. In addition, the image decoding apparatus 200 may obtain, from a bitstream, and use syntax corresponding to the block shape information or the split type information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

What is claimed is:

1. An image decoding method comprising:
   when a current coding unit having a square shape includes a region that deviates from a lower boundary of an image, not obtaining, from a bitstream, split type information of the current coding unit, and obtaining a first block and a second block by splitting the current coding unit in a horizontal direction;
   when the first block includes a region that deviates from a right boundary of the image, splitting the first block in a vertical direction;
   when the current coding unit includes neither the region that deviates from the lower boundary of the image nor the region that deviates from the right boundary of the image, obtaining, from the bitstream, the split type information of the current coding unit and splitting the current coding unit into a plurality of coding units based on the split type information; and
   decoding a coding unit that is no longer split among the plurality of coding units.

2. An image encoding method comprising:
   when a current coding unit having a square shape includes a region that deviates from a lower boundary of an image, not generating split type information of the current coding unit, and obtaining a first block and a second block by splitting the current coding unit in a horizontal direction;
   when the first block includes a region that deviates from a right boundary of the image, splitting the first block in a vertical direction;
   when the current coding unit includes neither the region that deviates from the lower boundary of the image nor the region that deviates from the right boundary of the image, generating the split type information of the current coding unit and splitting the current coding unit into a plurality of coding units based on the split type information; and
   encoding a coding unit that is no longer split among the plurality of coding units.

3. A device for transmitting a bitstream, the device comprising:
   a processor configured to perform the image encoding method of claim 2; and
   a transmitter configured to transmit the bitstream.

* * * * *